(12) United States Patent
Marin et al.

(10) Patent No.: US 10,055,882 B2
(45) Date of Patent: Aug. 21, 2018

(54) SYSTEM AND METHOD FOR THREE-DIMENSIONAL SCANNING AND FOR CAPTURING A BIDIRECTIONAL REFLECTANCE DISTRIBUTION FUNCTION

(71) Applicant: AQUIFI, INC., Palo Alto, CA (US)

(72) Inventors: Giulio Marin, Sunnyvale, CA (US); Abbas Rafii, Palo Alto, CA (US); Carlo Dal Mutto, Sunnyvale, CA (US); Kinh Tieu, Sunnyvale, CA (US); Giridhar Murali, Sunnyvale, CA (US); Alvise Memo, Marcon (IT)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 15/678,075

(22) Filed: Aug. 15, 2017

(65) Prior Publication Data

US 2018/0047208 A1     Feb. 15, 2018

Related U.S. Application Data

(60) Provisional application No. 62/375,350, filed on Aug. 15, 2016.

(51) Int. Cl.
*G06T 15/50* (2011.01)
*G06K 9/62* (2006.01)
(Continued)

(52) U.S. Cl.
CPC ............ *G06T 15/506* (2013.01); *G06K 9/627* (2013.01); *G06K 9/6262* (2013.01); *G06T 7/001* (2013.01);
(Continued)

(58) Field of Classification Search
None
See application file for complete search history.

(56) References Cited

U.S. PATENT DOCUMENTS 6,025,847 A * 2/2000 Marks ................. G06T 19/20
                                                   345/419
7,707,137 B2   4/2010 Nazarian et al.
(Continued)

OTHER PUBLICATIONS

Yu, et al. Sparse Lumigraph Relighting by Illumination and Reflectance Estimation from Multi-View Images. *ACM SIGGRAPH 2006 Sketches*. ACM, 2006; one (1) sheet.
(Continued)

*Primary Examiner* — Saptarshi Mazumder
(74) *Attorney, Agent, or Firm* — Lewis Roca Rothgerber Christie LLP

(57) ABSTRACT

A method for generating a three-dimensional (3D) model of an object includes: capturing images of the object from a plurality of viewpoints, the images including color images; generating a 3D model of the object from the images, the 3D model including a plurality of planar patches; for each patch of the planar patches: mapping image regions of the images to the patch, each image region including at least one color vector; and computing, for each patch, at least one minimal color vector among the color vectors of the image regions mapped to the patch; generating a diffuse component of a bidirectional reflectance distribution function (BRDF) for each patch of planar patches of the 3D model in accordance with the at least one minimal color vector computed for each patch; and outputting the 3D model with the BRDF for each patch.

24 Claims, 14 Drawing Sheets
(4 of 14 Drawing Sheet(s) Filed in Color)

(51) Int. Cl.
*G06T 17/20* (2006.01)
*G06T 7/00* (2017.01)
*G06T 15/04* (2011.01)
*H04N 13/02* (2006.01)

(52) U.S. Cl.
CPC .............. *G06T 15/04* (2013.01); *G06T 17/20* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *H04N 13/025* (2013.01); *H04N 13/0282* (2013.01)

(56) References Cited

U.S. PATENT DOCUMENTS

| | | | |
|---|---|---|---|
| 7,929,142 B2 | 4/2011 | Ben-Ezra et al. | |
| 2003/0011596 A1* | 1/2003 | Zhang | G06T 15/506 345/426 |
| 2003/0151747 A1* | 8/2003 | Nagarajan | G01N 21/55 356/446 |
| 2008/0297502 A1* | 12/2008 | Simard | G06T 7/97 345/420 |
| 2014/0029796 A1* | 1/2014 | Fiorini | G06K 7/10861 382/103 |
| 2014/0317539 A1* | 10/2014 | Unpingco | G06F 3/0481 715/764 |
| 2015/0016712 A1* | 1/2015 | Rhoads | G06K 9/00208 382/154 |
| 2017/0091671 A1* | 3/2017 | Mitarai | G06F 17/30598 |
| 2017/0116498 A1* | 4/2017 | Raveane | G06K 9/6257 |
| 2017/0154462 A1* | 6/2017 | von Cramon | G06T 17/20 |

OTHER PUBLICATIONS

Luong, et al.; Recovery of Reflectances and Varying Illuminants from Multiple Views; AI Center, SRI International and Computer Graphics Lab, EPFL; In European Conference on Computer Vision, May 2002; pp. 1-15.

Ward, et al. Measuring and Modeling Anisotropic Reflection; Computer Organics, 26, 2, Jul. 1992; pp. 265-272.

Dana, et al.; Reflectance and Texture of Real-World Surfaces; Columbia University Technical Report, CUCS-048-96, Dec. 1996; pp. 1-59 w/ title sheet.

Nishino, et al.; Determining Reflectance Parameters and Illumination Distribution from a Sparse Set of Images for View-dependent Image Synthesis; Department of Info. Science, Grad. School of Science, The University of Tokyo, Japan and Microsoft Research; © 2001; pp. 1-8.

Xu, et al.; Recovering surface reflectance and multiple light locations and intensities from image data; Pattern Recognition Letters 29 (2008); pp. 1639-1647.

Nishino, et al.; Re-rendering from a Sparse Set of Images; Technical Report DU-CS-05-12, Department of Computer Science at Drexel University; Nov. 2005; pp. 1-20.

\* cited by examiner

SYSTEM AND METHOD FOR THREE-DIMENSIONAL SCANNING AND FOR CAPTURING A BIDIRECTIONAL REFLECTANCE DISTRIBUTION FUNCTION

CROSS-REFERENCE TO RELATED APPLICATION(S)

This application claims the benefit of U.S. Provisional Patent Application No. 62/375,350, filed in the United States Patent and Trademark Office on Aug. 15, 2016, the entire disclosure of which is incorporated by reference herein.

FIELD

Aspects of embodiments of the present invention relate to image capture and image processing, such as the capture of three-dimensional scans of objects and the rendering of the three-dimensional scans in virtual scenes or environments.

BACKGROUND

In the field of three-dimensional graphics, three-dimensional (3D) models of objects such as trees and plants, furniture, buildings, and the like may be arranged in a virtual scene or virtual environment. Various virtual light sources may be placed within the scene, along with a virtual camera, and a rendering engine can render a view (or multiple views in the case of multiple cameras) of the scene by simulating the interactions between the light sources, the models of the objects in the scene, and the virtual camera. One example of a 3D rendering technique is ray tracing.

The three-dimensional models may be generated using modeling software, where a user may, for example, assemble geometric primitives to form the shape of an object, or create and distort meshes of polygons that represent the surface of the modeled object. For example, 3D models may be generated using computer aided design (CAD) and computer aided modeling (CAM) software during a product design. For example, manufacturers of an industrial product may generate these models for design analysis and also for fabricating the product. The 3D models generated through these processes can also be used to demonstrate the product and its components. However, not all manufacturers produce 3D CAD/CAM models of their products and even if such models existed, they may not be available for use by others. Furthermore, the final product may have colors and textures that differ from the original 3D models that were created during design.

The way an object appears in a real-world environment depends on the position of the light sources, viewing position and the reflectance and transmittance properties of the object facing the camera or the viewer. For example, if the object has a matte texture (e.g., a suede shoe), then the color of the object may be substantially invariant with respect to the positions of the light sources and the position of the viewer (in other words, the object appears to be the same color from different angles)

However, if the surface of the object is glossy (e.g., a polished leather shoe), then the color may depend on the lighting and viewing angles (e.g., specular highlights may be visible from particular combinations of light source direction and viewer direction, and the color of the highlight may depend on the color of the light source). Therefore, the shape (or geometry) and color of an object alone do not provide the rendering engine with sufficient information to generate a realistic rendering.

In order to accurately depict objects made of different various types of materials or having different surface characteristics, the rendering engine uses various optical characteristics of the materials to simulate the interactions of the light with the object. In particular, an accurate rendering of a surface may take into account whether the object is glossy, semi-glossy, matte, dull, metallic, translucent, etc. The reflectance and scattering aspects of the optical characteristics of an object are sometimes represented as a bidirectional reflectance distribution function (BRDF) (see, e.g., Ward, G. J. 1992. Measuring and modeling anisotropic reflection. Comput. Graph. 26, 2, ACM SIGGRAPH (July), 265-272). The BRDF of an object may be different for different parts of an object. For example, some parts of a polished shoe may be scuffed, thereby causing the scuffed portions to appear more matte than glossy. As another example, different parts of the shoe (e.g., the sole versus the upper) may be made of different materials (e.g., rubber versus leather) and may therefore have different optical properties.

SUMMARY

Aspects of embodiments of the present invention relate to systems and methods for scanning an object and capturing a bidirectional reflectance distribution function (BRDF) of the object along with a three-dimensional (3D) model of the object. Some embodiments of the present invention may be implemented using low cost three-dimensional scanning systems, thereby avoiding the high costs associated with elaborate special purpose systems of cameras and lighting sources, and specialized studios environments. Some embodiments of the present invention may be implemented by capturing 3D model and BRDF that are simply a collection of 2D views of the object from multiple orientations. The captured BRDF and 3D model of the object may be used to render realistic depictions of the object within a scene, and further allows the re-rendering of the 3D model in different scenes under different lighting conditions, with substantially no artifacts that arise due to the lighting conditions during the 3D scan of the object.

In addition, aspects of embodiments of the present invention are directed to systems and methods for quality monitoring and defect detection. For example, a 3D scanning system according to embodiments of the present invention may capture a 3D scan of an object produced on a manufacturing line. Such a 3D scan may capture a substantially diffuse or Lambertian model of the color information of the object on the manufacturing line, thereby removing visual artifacts in the captured model that arise due to specular highlights from bright and directed lights. This removal of artifacts arising from specular highlights improves the robust comparison of the captured 3D scan of the object with a reference sample of an object with no defects, thereby enabling the detection of defects in objects on the manufacturing line. Furthermore, captured information regarding the BRDF of the object may also be used to detect defects in the surface of the object, such as the detection of scuffing or imperfections in portions that are expected to be glossy, or the detection of smooth portions that are expected to be textured. Alternatively, the removal of artifacts from specular highlights may eliminate a feature that appears to be a defect but is actually caused by the lighting conditions.

According to one embodiment of the present invention, a method for generating a three-dimensional (3D) model of an object includes: capturing a plurality of images of the object from a plurality of viewpoints, the images including a plurality of color images; generating a 3D model of the object from the images, the 3D model including a plurality of planar patches; for each patch of the planar patches: mapping a plurality of image regions of the plurality of images to the patch, each image region including at least one color vector; and computing, for each patch, at least one minimal color vector among the color vectors of the image regions mapped to the patch; generating a diffuse component of a bidirectional reflectance distribution function (BRDF) for each patch of planar patches of the 3D model in accordance with the at least one minimal color vector computed for each patch; and outputting the 3D model with the BRDF for each patch, the BRDF further including a specular component separate from the diffuse component.

The method may further include: aligning the 3D model with a reference model; comparing the 3D model to the reference model to compute a plurality of differences between corresponding portions of the 3D model and the reference model; and detecting a defect in the object when one or more of the plurality of differences exceeds a threshold.

The method may further include: rendering one or more diffuse renderings of the object; computing a plurality of features based on the one or more diffuse renderings of the object; and assigning a classification to the object in accordance with the plurality of features, the classification include one of: a defective classification and a clean classification.

The assigning the classification to the object in accordance with the plurality of features may be performed by a convolutional neural network, and the convolutional neural network may be trained by: receiving a plurality of training 3D models of objects and corresponding training classifications; rendering a plurality of views of the 3D models with controlled lighting to generate training data; computing a plurality of feature vectors from the views by the convolutional neural network; computing parameters of the convolutional neural network; computing a training error metric between the training classifications of the training 3D models with outputs of the convolutional neural network configured based on the parameters; computing a validation error metric in accordance with a plurality of validation 3D models separate from the training 3D models; in response to determining that the training error metric and the validation error metric fail to satisfy a threshold, rendering additional views of the 3D models with different controlled lighting to generate additional training data; in response to determining that the training error metric and the validation error metric satisfy the threshold, configuring the neural network in accordance with the parameters; receiving a plurality of test 3D models of objects with unknown classifications; rendering a plurality of views of the test 3D models with controlled lighting to generate testing data; and classifying the test 3D models using the rendered views of the test 3D models and the configured convolutional neural network.

The method may further include receiving a user input specifying one or more parameters of the specular component of the BRDF. The user may also specify properties of the ambient illumination, such as position, type and color of the lights affecting the captured scene.

The specified one or more parameters of the specular component of the BRDF may be applied to a selected portion of the 3D model.

The method may further include computing the specular component of the BRDF, the computing the specular component including: subtracting the at least one minimal color vector from the color vector of each of the image regions mapped to the patch to compute a plurality of specular images of the patch; and computing one or more parameters of the specular component. The computing the one or more parameters of the specular component may include: initializing the one or more parameters; rendering the 3D model in accordance with the BRDF set in accordance with the one or more parameters to render a plurality of rendered views of the patch; computing an error function in accordance with a difference between the rendered views of the patch with the image regions mapped to the patch; and computing the one or more parameters by iteratively updating the one or more parameters to minimize the error function.

The method may further include: arranging the 3D model in a virtual environment including a virtual camera and at least one light source; rendering an image of the virtual environment including the 3D model, the image including at least one specular highlight from the reflection of the at least one light source off the 3D model; and displaying the image.

The plurality of images may be captured by a plurality of different cameras. The plurality of images of the object are captured while the object is on a conveyor belt.

The plurality of images of the object from the plurality of viewpoints may be captured by a single camera. The single camera may be a stereoscopic depth camera including a first infrared camera, a second infrared camera, and a color camera.

The 3D model may be a model of less than the entire exterior surface of the object.

According to one embodiment of the present invention, a system for generating a three-dimensional (3D) model of an object includes: a depth camera system; a processor coupled to the depth camera system; and memory having instructions stored thereon that, when executed by the processor, cause the processor to: capture a plurality of images of the object from a plurality of viewpoints, the images including a plurality of color images; generate a 3D model of the object from the images, the 3D model including a plurality of planar patches; for each patch of the planar patches: map a plurality of image regions of the plurality of images to the patch, each image region including at least one color vector; and compute, for each patch, at least one minimal color vector among the color vectors of the image regions mapped to the patch; generate a diffuse component of a bidirectional reflectance distribution function (BRDF) for each patch of planar patches of the 3D model in accordance with the at least one minimal color vector computed for each patch; and output the 3D model with the BRDF for each patch, the BRDF further including a specular component separate from the diffuse component.

The memory may further store instructions that, when executed by the processor, cause the processor to: align the 3D model with a reference model; compare the 3D model to the reference model to compute a plurality of differences between corresponding portions of the 3D model and the reference model; and detect a defect in the object when one or more of the plurality of differences exceeds a threshold.

The memory may further store instructions that, when executed by the processor, cause the processor to: render one or more diffuse renderings of the object; compute a plurality of features based on the one or more diffuse renderings of the object; and assign a classification to the object in accordance with the plurality of features, the classification including one of: a defective classification and a clean classification.

The instructions configured to cause the processor to assign the classification to the object in accordance with the plurality of features may supply the features to a convolutional neural network, and the convolutional neural network may be trained by: receiving a plurality of training 3D models of objects and corresponding training classifications; rendering a plurality of views of the 3D models with controlled lighting to generate training data; computing a plurality of feature vectors from the views by the convolutional neural network; computing parameters of the convolutional neural network; computing a training error metric between the training classifications of the training 3D models with outputs of the convolutional neural network configured based on the parameters; computing a validation error metric in accordance with a plurality of validation 3D models separate from the training 3D models; in response to determining that the training error metric and the validation error metric fail to satisfy a threshold, rendering additional views of the 3D models with different controlled lighting to generate additional training data; in response to determining that the training error metric and the validation error metric satisfy the threshold, configuring the neural network in accordance with the parameters; receiving a plurality of test 3D models of objects with unknown classifications; rendering a plurality of views of the test 3D models with controlled lighting to generate testing data; and classifying the test 3D models using the rendered views of the test 3D models and the configured convolutional neural network.

The memory may further store instructions that, when executed by the processor, cause the processor to receive a user input specifying one or more parameters of the specular component of the BRDF. The specified one or more parameters of the specular component of the BRDF may be applied to a selected portion of the 3D model.

The memory may further store instructions that, when executed by the processor, cause the processor to: compute the specular component of the BRDF for each of the planar patches by: subtracting the at least one minimal color vector from the color vector of each of the image regions mapped to the patch to compute a plurality of specular images of the patch; and computing one or more parameters of the specular component. The memory may further store instructions that, when executed by the processor, cause the processor to: compute the specular component of the BRDF for each of the planar patches by: initializing the one or more parameters; rendering the 3D model in accordance with the BRDF set in accordance with the one or more parameters to render a plurality of rendered views of the patch; computing an error function in accordance with a difference between the rendered views of the patch with the image regions mapped to the patch; and computing the one or more parameters by iteratively updating the one or more parameters to minimize the error function.

The memory may further store instructions that, when executed by the processor, cause the processor to: arrange the 3D model in a virtual environment including a virtual camera and at least one light source; render an image of the virtual environment including the 3D model, the image including at least one specular highlight from the reflection of the at least one light source off the 3D model; and display the image.

The system may further include a plurality of different cameras, wherein the plurality of images are captured by the plurality of different cameras. The plurality of different cameras may be configured to image the object while the object is on a conveyor belt.

The system may further include a single camera, wherein the plurality of images of the object from the plurality of viewpoints are captured by the single camera. The camera may be a stereoscopic depth camera including a first infrared camera, a second infrared camera, and a color camera.

The 3D model may be a model of less than the entire exterior surface of the object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1A:
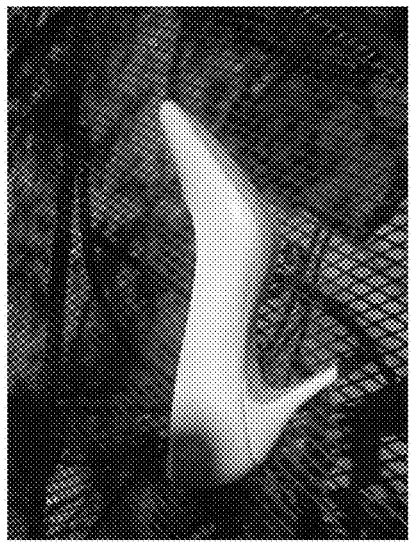
FIGS. 1A, 1B, 1C, and 1D show four photographs of a shoe under different lighting conditions.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to three-dimensional (3D) scanning using a camera (which may include two or more lenses configured to project light onto two or more corresponding separate image sensors) to collect data from different views of an object, and to align and combine the data to create a 3D model of the shape and color (if available) of the object. One example of a system and method for scanning objects is described in U.S. patent application Ser. No. 15/445,735, "System and Method for Assisted 3D Scanning," filed in the United States Patent and Trademark Office on Feb. 28, 2017, the entire disclosure of which is incorporated by reference herein. Three-dimensional scanning techniques allow its users to generate three-dimensional models of objects for use in creating and rendering three-dimensional environments without the time and expense of generating a three-dimensional model manually using computer aided design (CAD) or computer aided modeling (CAM) software or without having to request such a 3D model from another party. These scanned 3D models may be useful in a variety of contexts, such as electronic commerce, real estate, architectural designs, augmented reality applications, and the like.

A 3D scanning system typically generates or produces a "point cloud," which is a set of 3D point locations, where each of these points lies on the surface of the object being scanned. These points can be organized to form the vertices of a "mesh" of triangles or other polygons, which is used to represent the surface of the scanned object. Each polygon may also be texturized (e.g., color information may be applied to the surface of the object). In addition, the vector normal to the surface at each point's location, or for each polygon, can be computed from the location of three or more nearby measured 3-D points.

Figure 1B:
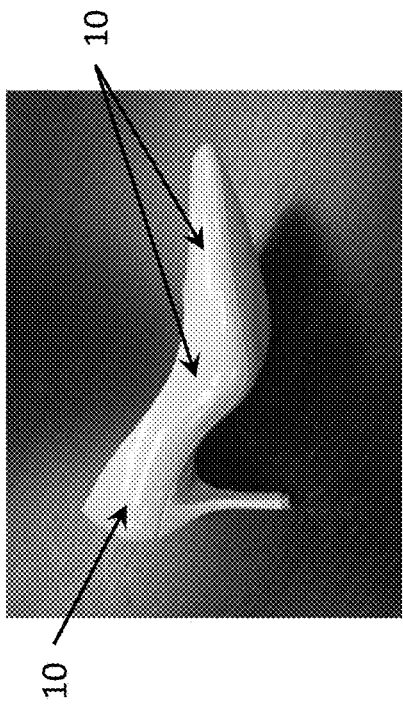
Figure 1C:
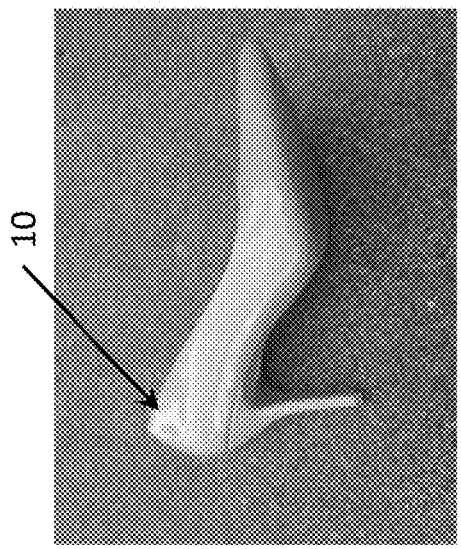
Figure 1D:

However, generally, a three-dimensional scanner does not capture the bidirectional reflectance distribution function (BRDF) of the object being scanned. As a result, specular reflections (e.g., specular highlights) captured during the scan may be stored (or "baked-in") to the texture information (e.g., surface color information) of the object, rather than stored as a separate component. For example, specular highlights of a glossy polished shoe may appear as bright white shapes on the surface of the shoe. FIGS. 1A, 1B, 1C, and 1D show four photographs of the same shoe under different lighting conditions. FIG. 1A is a photograph of the shoe outdoors on a sunny day, FIG. 1B is a photograph of the shoe outdoors under shadow, FIG. 1C depicts the shoe indoors under diffuse lighting, and FIG. 1D depicts the shoe indoors under florescent ceiling lights. As seen in FIGS. 1A and 1D, specular highlights 10 appear when the shoe is illuminated by direct light (e.g., the sun and the ceiling lights, respectively), and fewer or no such specular highlights appear when the shoe is under diffuse light, as shown in FIGS. 1B and 1C.

Figure 2A:
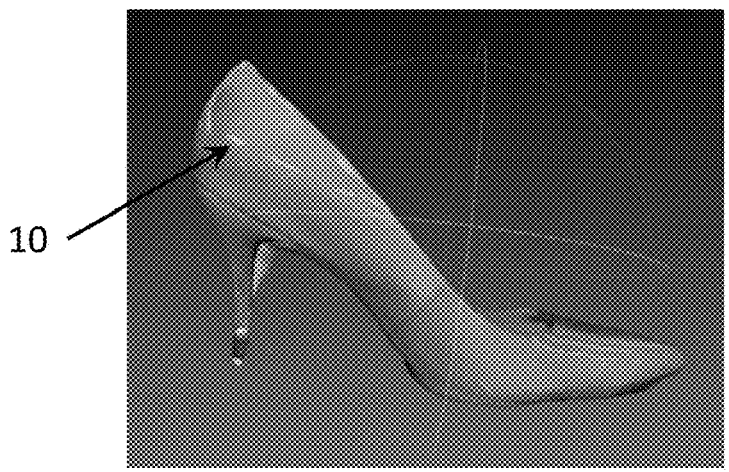
FIGS. 2A, 2B, and 2C depict different views of a 3D model of a shoe, where the 3D model is generated by performing a three-dimensional scan of a physical shoe using a three-dimensional scanner, and where the 3D model has "baked-in" specular highlights.
Figure 2B:
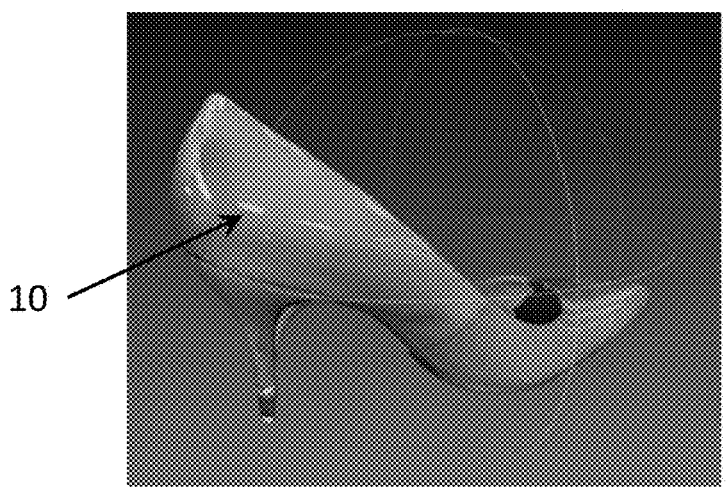
Figure 2C:
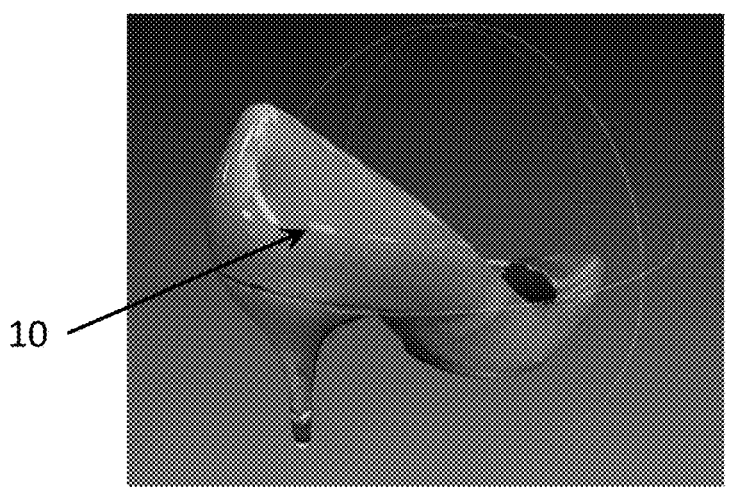

FIGS. 2A, 2B, and 2C depict different views of a 3D model of a shoe, where the 3D model is generated by performing a three-dimensional scan of a physical shoe using a three-dimensional scanner, and where the 3D model has "baked-in" specular highlights. When such an object with baked-in specular highlights in rendered in a virtual environment having significantly different lighting characteristics than the lighting environment in which the object was originally scanned, the object may look out of place or incorrect. This is because the surface of the object may show reflections from light sources that were present in the scene during capture, but that do not exist in the virtual scene. As shown in FIGS. 2A, 2B, and 2C, the specular highlights 10 are shown in the same places on the shoe itself without regard to viewing angle. This is because those specular highlights are stored in the color information of the shoe, in accordance with the static position of the light source at the time of the scan.

Figure 3A:
FIGS. 3A, 3B, and 3C are photographs of a shoe that are taken from three different viewpoints.
Figure 3B:
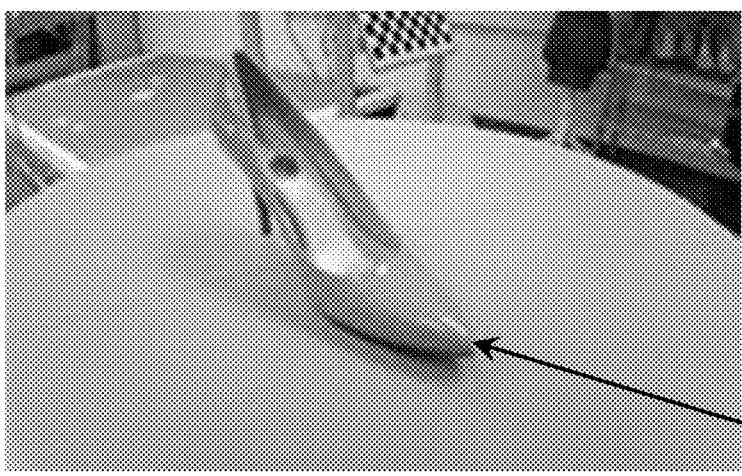
Figure 3C:
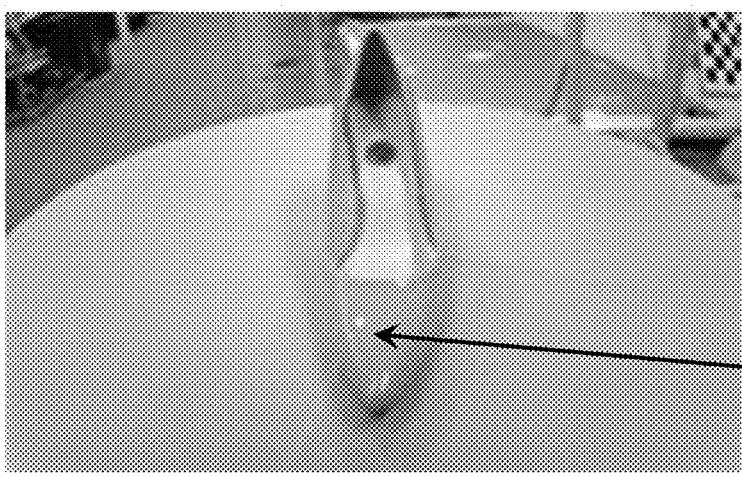

In contrast, FIGS. 3A, 3B, and 3C are photographs of a shoe that are taken from three different viewpoints. As seen in FIGS. 3A, 3B, and 3C, the shapes and positions of the specular highlights 10 are different from each viewpoint.

Furthermore, without BRDF information associated with the model, the rendering engine may not be able to render accurate reflections of, on the rendered model, light sources in the virtual scene, such that the lighting on the object does not appear to change correctly as the object is moved in the virtual scene.

On the other hand, when BRDF information is available, the rendering engine can show how the model of the real world object would look, for example, on a kitchen counter with bright daylight through a window, under dimmer incandescent lights at a dining table, under multicolored lights of a dance floor, or illuminated by flames from a fire breathing dragon.

In addition, in the context of applying 3D scanning systems to quality control and defect detection, capturing BRDF information can provide additional data to increase the accuracy of such defect detection systems. For example, specular highlights may mask or hide defects in the outer surface of an object. A specular highlight on an object may hide the fact that the object is scuffed (and therefore has an uneven appearance) at the location of the specular highlight. As another example, BRDF information can be used to determine that all surfaces of the object are reflective or matte, or some other characteristic. These defect detection systems may be applicable in a manufacturing context, such as assembly lines for shoes, clothing, consumer electronics, mechanical parts, and vehicles.

As such, aspects of embodiments of the present invention relate to the automatic capture of BRDF along with the three-dimensional model of an object, thereby producing a model that can be supplied to a rendering engine to accurately re-light the object in another environment, and that can be supplied to a quality control system for ensuring that the scanned products meet threshold levels of quality.

Scanner Systems

Generally, scanner systems include hardware devices that include a sensor, such as a camera, that collects data from a scene. The scanner systems may include a computer processor or other processing hardware for generating depth images and/or three-dimensional (3D) models of the scene from the data collected by the sensor.

The sensor of a scanner system may be, for example one of a variety of different types of cameras including: an ordinary color camera; a depth (or range) camera; or a combination of depth and color camera. The latter is typically called RGB-D where RGB stands for the color image and D stands for the depth image (where each pixel encodes the depth (or distance) information of the scene.) The depth image can be obtained by different methods including geometric or electronic methods. A depth image may be represented as a point cloud or may be converted into a point cloud. Examples of geometric methods include passive or active stereo camera systems and structured light camera systems. Examples of electronic methods to capture depth images include Time of Flight (TOF), or general scanning or fixed LIDAR cameras.

Depending on the type of camera, different algorithms may be used to generate depth images from the data captured by the camera. A class of algorithms called Dense Tracking and Mapping in Real Time (DTAM) uses color cues in the captured images, while another class of algorithms referred to as Simultaneous Localization and Mapping (SLAM) uses depth (or a combination of depth and color) data, while yet another class of algorithms are based on the Iterative Closest Point (ICP) and its derivatives.

As described in more detail below with respect to FIG. 4, at least some depth camera systems allow a user to freely move the camera around the object to capture all sides of the object. The underlying algorithm for generating the combined depth image may track and/or infer the pose of the camera with respect to the object in order to align the captured data with the object or with a partially constructed 3D model of the object. One example of a system and method for scanning three-dimensional objects is described in "Systems and methods for scanning three-dimensional objects" U.S. patent application Ser. No. 15/630,715, filed in the United States Patent and Trademark Office on Jun. 22, 2017, the entire disclosure of which is incorporated herein by reference.

In some embodiments of the present invention, the construction of the depth image or 3D model is performed locally by the scanner itself. It other embodiments, the processing is performed by one or more local or remote servers, which may receive data from the scanner over a wired or wireless connection (e.g., an Ethernet network connection, a USB connection, a cellular data connection, a local wireless network connection, and a Bluetooth connection).

As a more specific example, the scanner may be a hand-held 3D scanner. Such hand-held 3D scanners may include a depth camera (a camera that computes the distance of the surface elements imaged by each pixel) together with software that can register multiple depth images of the same surface to create a 3D representation of a possibly large surface or of a complete object. Users of hand-held 3D scanners need to move it to different positions around the object and orient it so that all points in the object's surface are covered (e.g., the surfaces are seen in at least one depth image taken by the scanner). In addition, it is important that each surface patch receive a high enough density of depth measurements (where each pixel of the depth camera provides one such depth measurement). The density of depth measurements depends on the distance from which the surface patch has been viewed by a camera, as well as on the angle or slant of the surface with respect to the viewing direction or optical axis of the depth camera.

Figure 4:
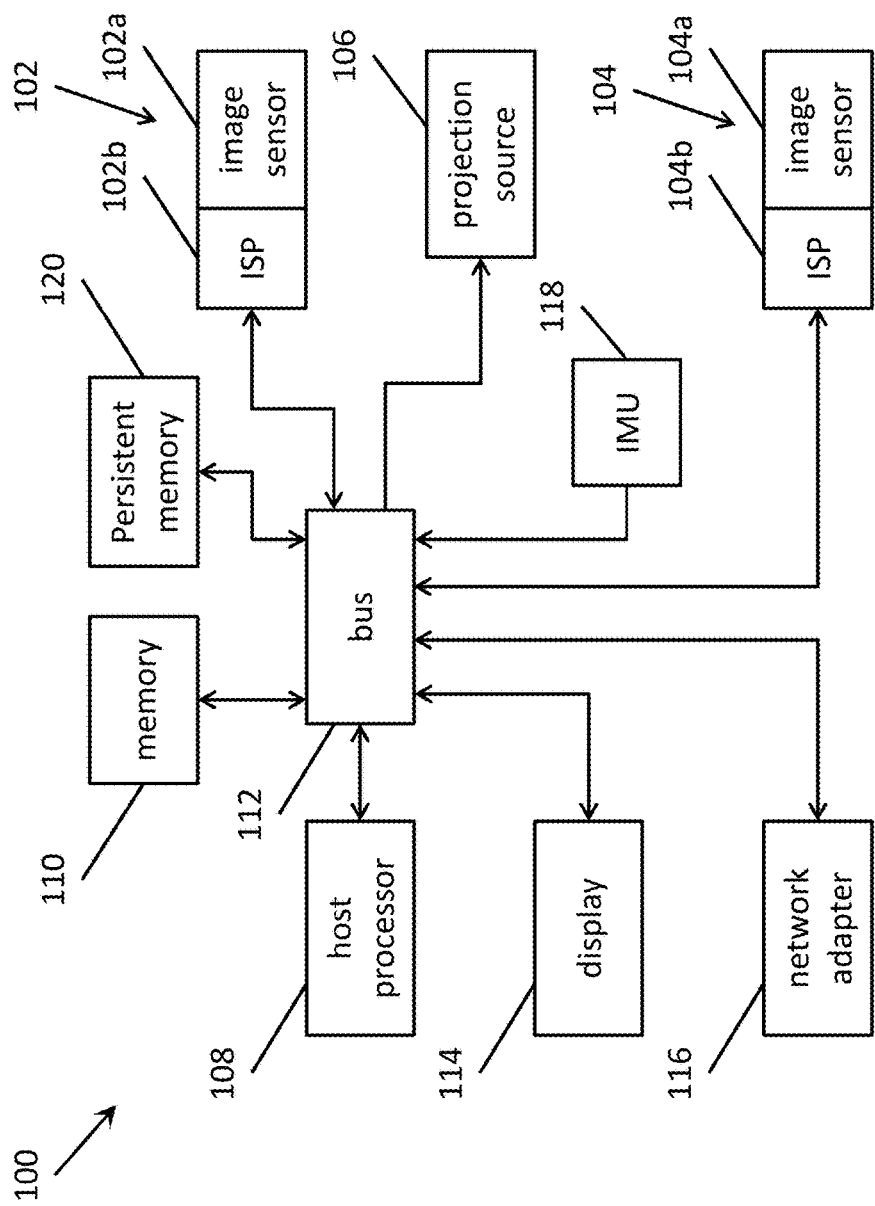
FIG. 4 is a block diagram of a scanner system according to one embodiment of the present invention.

FIG. 4 is a block diagram of a scanning system as a stereo depth camera system according to one embodiment of the present invention.

The scanning system 100 shown in FIG. 4 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The scanning system 100 may include additional components such as a display 114 to allow the device to display images, a network adapter 116 to communicate with other devices, an inertial measurement unit (IMU) 118 such as a gyroscope to detect acceleration of the scanning system 100 (e.g., detecting the direction of gravity to determine orientation and detecting movements to detect position changes), and persistent memory 120 such as NAND flash memory for storing data collected and processed by the scanning system 100. The IMU 118 may be of the type commonly found in many modern smartphones. The image capture system may also include other communication components, such as a universal serial bus (USB) interface controller.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

The memory 110 and/or the persistent memory 120 may store instructions that, when executed by the host processor 108, cause the host processor to perform various functions. In particular, the instructions may cause the host processor to read and write data to and from the memory 110 and the persistent memory 120, and to send commands to, and receive data from, the various other components of the scanning system 100, including the cameras 102 and 104, the projection source 106, the display 114, the network adapter 116, and the inertial measurement unit 118.

The host processor 108 may be configured to load instructions from the persistent memory 120 into the memory 110 for execution. For example, the persistent memory 120 may store an operating system and device drivers for communicating with the various other components of the scanning system 100, including the cameras 102 and 104, the projection source 106, the display 114, the network adapter 116, and the inertial measurement unit 118.

The memory 110 and/or the persistent memory 112 may also store instructions that, when executed by the host processor 108, cause the host processor to generate a 3D point cloud from the images captured by the cameras 102 and 104, to execute a 3D model construction engine, and to perform texture mapping. The persistent memory may also store instructions that, when executed by the processor, cause the processor to compute a bidirectional reflectance distribution function (BRDF) for various patches or portions of the constructed 3D model, also based on the images captured by the cameras 102 and 104. The resulting 3D model and associated data, such as the BRDF may be stored in the persistent memory 120 and/or transmitted using the network adapter 116 or other wired or wireless communication device (e.g., a USB controller or a Bluetooth controller).

To detect the depth of a feature in a scene imaged by the cameras, the instructions for generating the 3D point cloud and the 3D model and for performing texture mapping are executed by the depth camera system 100 determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3D point in the scene projects onto the same scanline index in the master and in the slave image. Let $u_m$ and $u_s$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3D point with respect to the rectified cameras (that is, the length of the orthogonal projection of the point onto the optical axis of either camera).

Stereoscopic algorithms exploit this property of the disparity. These algorithms achieve 3D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3D details such as the one described in U.S. Pat. No. 9,392,262 "System and Method for 3D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

In some circumstances, the depth camera system includes two components: a detachable scanning component and a display component. In some embodiments, the display component is a computer system, such as a smartphone, a tablet, a personal digital assistant, or other similar systems. Scanning systems using separable scanning and display components are described in more detail in, for example, U.S. patent application Ser. No. 15/382,210 "3D Scanning Apparatus Including Scanning Sensor Detachable from Screen" filed in the United States Patent and Trademark Office on Dec. 16, 2016, the entire disclosure of which is incorporated by reference.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3D model. For example, Dense Tracking and Mapping in Real Time (DTAM) uses color cues for scanning and Simultaneous Localization and Mapping uses depth data (or a combination of depth and color data) to generate the 3D model.

In some embodiments of the present invention, the memory 110 and/or the persistent memory 112 may also store instructions that, when executed by the host processor 108, cause the host processor to execute a rendering engine. In other embodiments of the present invention, the rendering engine may be implemented by a different processor (e.g., implemented by a processor of a computer system connected to the scanning system 100 via, for example, the network adapter 116 or a local wired or wireless connection such USB or Bluetooth). The rendering engine may be configured to render an image (e.g., a two-dimensional image) of the 3D model generated by the scanning system 100.

Figure 5A:
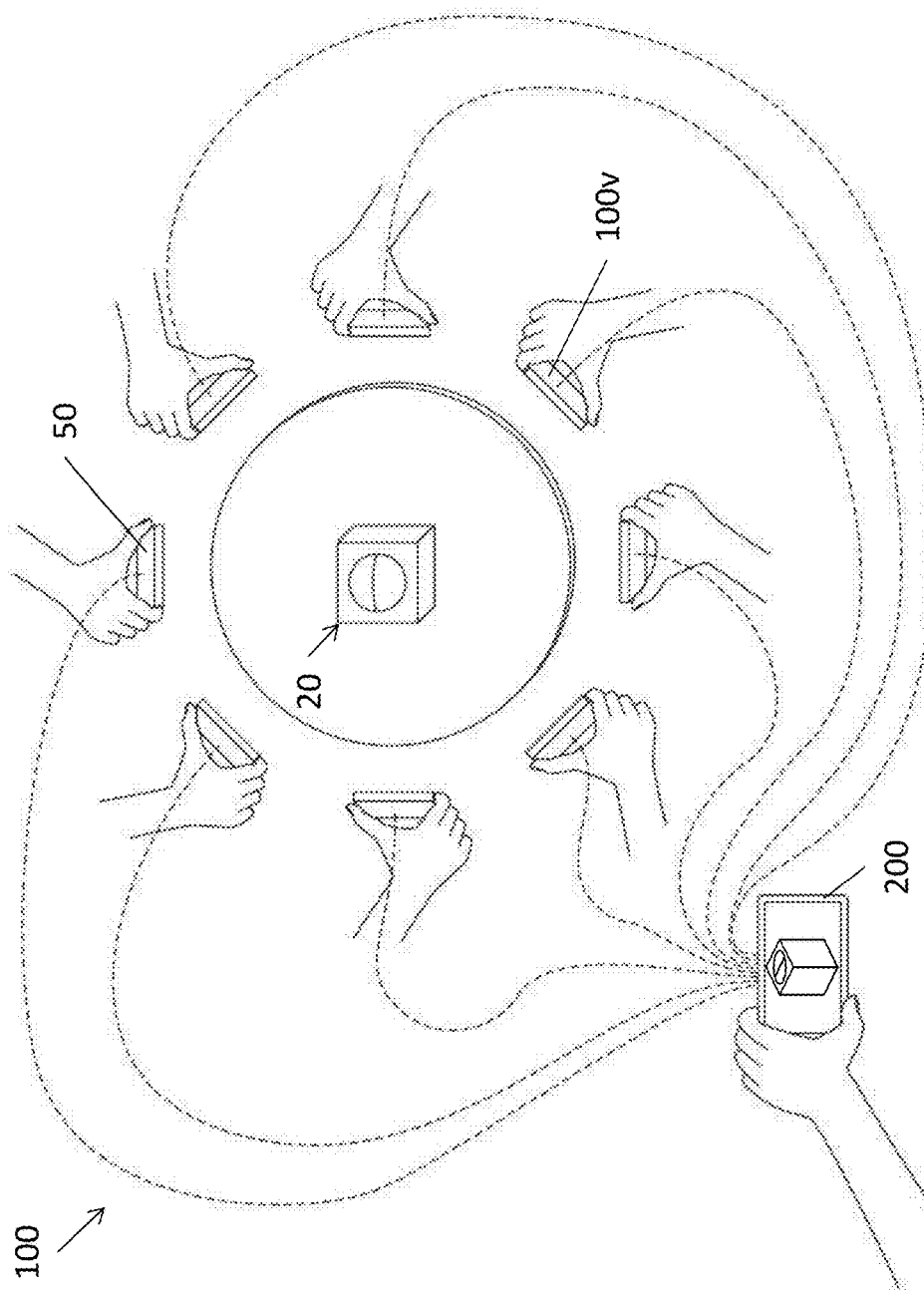
FIG. 5A illustrates, from the perspective of a user, a system and method for scanning an object using a 3D scanning system including a camera separate from a screen according to one embodiment of the present invention.

FIG. 5A illustrates, from the perspective of a user, a system and method for scanning an object 20 in a fixed location using a 3D scanning system 100 including a scanning sensor (or camera) separate from a screen according to one embodiment of the present invention. In particular, FIG. 5 illustrates a single scanning sensor module 50 at eight different physical positions around the object 20 at eight different points in time. The dotted line between the scanning sensor module 50 and the scanning device 200 indicates the data connection between the two pieces of hardware, where the scanning device 200 may transmit commands to the scanning sensor module 50 over the data connection, and the scanning sensor module 50 may transmit data, including images, to the scanning device 200.

As seen in FIG. 5, the user 22 may hold the scanning sensor module 50 (e.g., the camera) in one hand (depicted in FIG. 5 as the right hand) and may hold the scanning device 200 (e.g., a smartphone, tablet computer, personal digital assistant, or other handheld device with a display) in the other hand (depicted in FIG. 5 as the left hand). As shown in FIG. 5, the user may move the scanning sensor from the front of the object to the back of the object without changing the position of the scanning device 200. While the user scans the object 20 (as shown in FIG. 5, a tissue box) with the scanning sensor, the scanning device 200 displays a view 202 (e.g., a real time view) or representation of the images captured by the scanning sensor module. As depicted in FIG. 5, the user may have a more top-down view of the object 20, but the user 22 may position the scanning sensor module 50 to have a side view of the object 20. The view 202 on the scanning device 200 shown in FIG. 5 corresponds to the side view image captured by the scanning sensor module 50 at position 100v. This may enable the user 22 to scan the object 20 more easily and comfortably by manipulating the position of the scanning sensor module 50 without having to contort his or her body to maintain sight of the view 202 on the display of the scanning device 200. Therefore, the user receives real time feedback regarding the data being captured by the scanning sensor, thereby helping to ensure that all sides of the object, including the top, are imaged by the scanning sensor.

Without this feedback, a user may inadvertently orient the scanning sensor in a direction that fails to capture useful images of the object. For example, the user may inadvertently capture images of the ceiling or the floor, or may capture images of the background. In addition, in a comparative imaging system in which the camera and the display are rigidly fixed to one another, the fixed relationship between the field of view of the camera and the viewing direction of the display of the imaging system can make it difficult for the user to maintain a view of the screen while scanning all sides of the object.

Figure 5B:
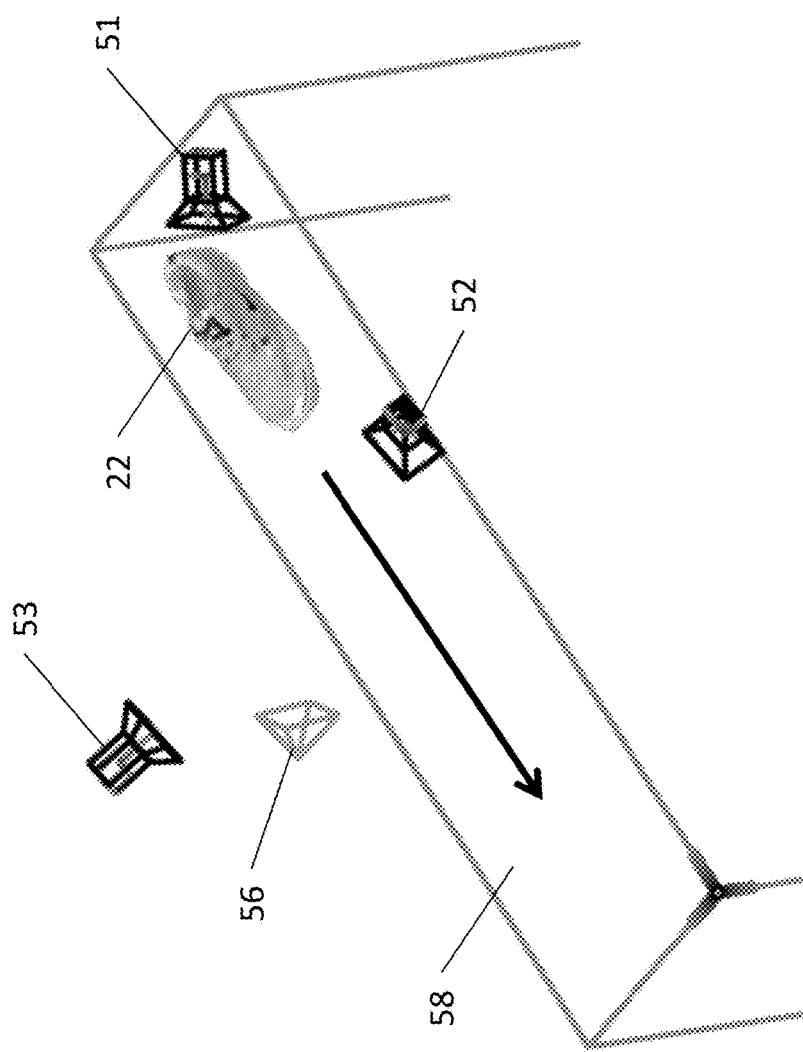
FIG. 5B is a schematic diagram of a system and method for scanning an object moving along on a conveyor belt using a 3D scanning system including multiple stationary cameras according to one embodiment of the present invention.
Figure 5C:
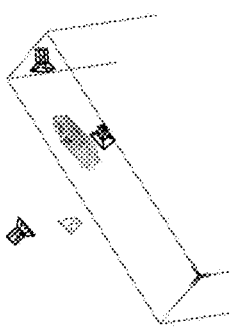
FIGS. 5C through 5K are schematic diagrams of a system and method for scanning an object moving along on a conveyor belt using a 3D scanning system including multiple stationary cameras according to one embodiment of the present invention, where each figure shows the object at a different position along the conveyor belt.
Figure 5F:
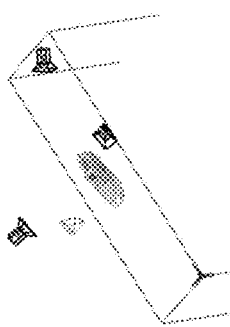
Figure 5I:
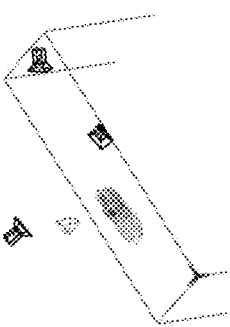
Figure 5D:
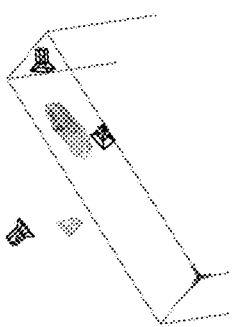
Figure 5G:
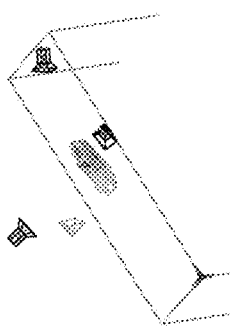
Figure 5J:
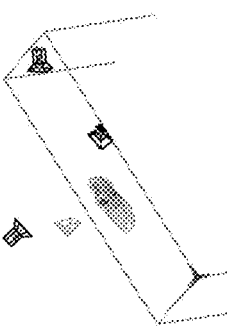
Figure 5E:
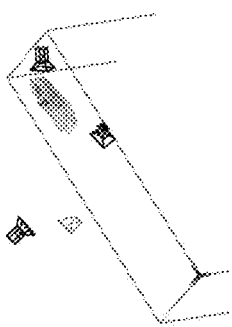
Figure 5H:
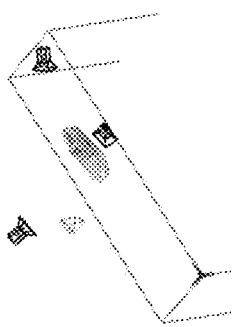
Figure 5K:
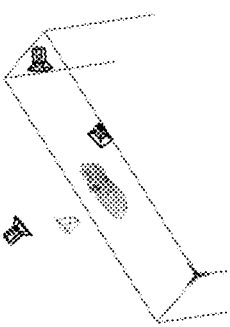

FIG. 5B is a schematic diagram of a system and method for scanning an object moving along on a conveyor belt using a 3D scanning system including multiple stationary cameras according to one embodiment of the present invention. In the example depicted in FIG. 5B, a shoe 22 is placed on a moving conveyor belt 58, which moves the shoe 22 in the direction shown. Three cameras 51, 52, and 53 are configured to image objects on the conveyor belt from different angles, and a light source 56 is configured to illuminate objects on the conveyor belt 58. While the cameras 51, 52, and 53 may be stationary (e.g., have fixed positions with respect to the conveyor belt 58), as shown in FIGS. 5C-5K, the objects 22 on the belt move with respect to the cameras. As such, the cameras 51, 52, and 53 capture a variety of different views of the object as the object moves past the cameras, thereby allowing imaging of the object to generate a three-dimensional model without the need to move a camera around the object.

Once the three-dimensional geometry of the scanned object has been acquired and processed by the scanning system, it is possible to perform some refinement to obtain a clean three-dimensional model. The three-dimensional model may also be associated with texture information (e.g., color information). Such a model may be represented as a mesh. Creating a textured model is more complex than creating an un-textured model, in part because a viewer of the textured model may have higher expectations for photorealism and due to the additional challenge of aligning the textures with the surface of the mesh. Various techniques based on photometric error minimization and graph cut optimization may be applied in the creation of textured models, and, in some embodiments, such techniques may be performed by a server, rather than the scanner itself.

In the systems shown in FIGS. 5A and 5B, less than the entire exterior surface of the object may be captured. For example, in the arrangement of FIG. 5A, only the top and sides of the object 20 will be captured by the scan, while the portion of the object on the supporting surface (e.g., on the table) will be hidden from view of the scanning system. Similarly, as shown in FIG. 5B, substantially all of the sole of the shoe will be facing the conveyor belt and therefore be hidden from view of the cameras 51, 52, and 53. As such, aspects of embodiments of the present invention may be directed to capturing and analyzing a 3D model that includes less than the entire exterior surface of an object. However, embodiments of the present invention are not limited thereto, and may also be applied in circumstances where the 3D model does include the entire exterior surface of the object (e.g., by merging 3D models of chunks of the object captured during different scans).

Bidirectional Reflectance Distribution Function

For the sake of clarity and convenience, the Bidirectional Reflectance Distribution Function (BRDF) will be briefly described below.

Figure 6:
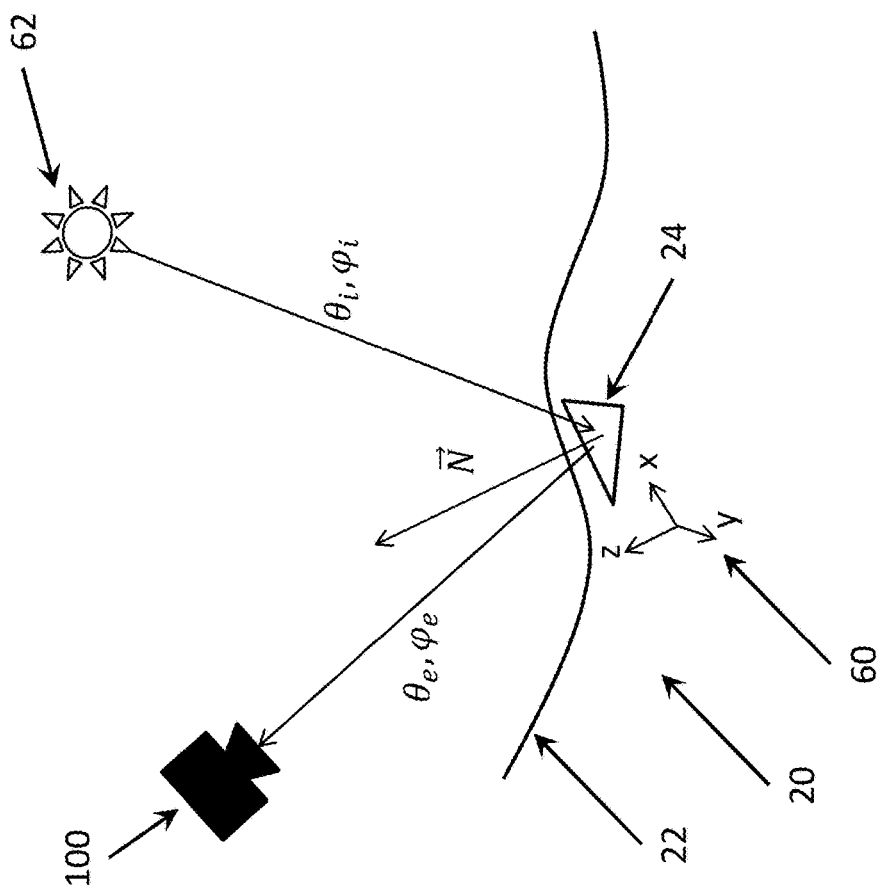
FIG. 6 is a schematic diagram illustrating a camera system capturing of an image of a patch that is illuminated by a light source.

FIG. 6 is a schematic diagram illustrating a camera system capturing of an image of a patch that is illuminated by a light source. As shown in FIG. 6, an object having a surface 22 may be approximated by a collection of planar patches, one of which is shown as patch 24 (in FIG. 6, the patch is shown as being triangular). For the sake of convenience, a reference frame 60 may be defined with respect to the orientation of the patch, where, for example, the z axis is defined along the direction orthogonal to the patch and the x and y axes are defined along the plane of the patch. A unit normal vector $\vec{N}$ of the patch may be defined as a direction perpendicular to the patch and having a direction pointing outward from the object 20. The patch receives light from a light source 62 along a direction of incidence $\theta_i$, $\varphi_i$, where $\theta_i$ is the elevation angle and $\varphi_i$ is the azimuthal angle with respect to the reference frame 60. In addition, a scanning system 100 (e.g., a depth camera system) images the patch along a direction along which light is emitted from the patch $\theta_e$, $\varphi_e$ with respect to the reference frame 60. In the case of a scanning system having multiple cameras, such as a stereoscopic depth camera system, each camera (e.g., cameras 102 and 104 as shown in FIG. 4) receives light from the patch along a different direction $\theta_e$, $\varphi_e$. For example, the first camera 102 may receive light along direction $\theta_{e1}$, $\varphi_{e1}$ and the second camera 104 may receive light along the direction $\theta_{e2}$, $\varphi_{e2}$, and therefore the reflectance characteristics of the surface may cause the first camera 102 and the second camera 104 to detect different color data for the same patch.

The ratio between the irradiance $E(\theta_i, \varphi_i)$ on the surface patch due to the light source 62 and the radiance $L(\theta_e, \varphi_e)$ emitted in the direction $\theta_e$, $\varphi_e$ toward the scanning system 100 is called the bidirectional reflectance distribution function and is a function of both the illumination and viewing directions ($\theta_i$, $\varphi_i$ and $\theta_e$, $\varphi_e$, respectively) and the characteristics of the physical material of the surface 22 at the particular patch 24. In general, surfaces exhibit a mix of Lambertian reflectivity and specular reflectivity, as described in more detail below.

Some types of surfaces exhibit a BRDF that is constant over all incidence angles $\theta_i$, $\varphi_i$ and viewing angles $\theta_e$, $\varphi_e$. Such surfaces are said to be characterized by ideal Lambertian reflectivity. These materials have a matte appearance, and materials that typically exhibit substantially Lambertian reflectivity include clay, paper, and unfinished (e.g., unpolished) wood. The color of a Lambertian surface element is, to a first approximation, independent of the pose of the camera that images that surface. However, the color does depend on the direction of the light sources that illuminate in accordance with the cosine law. Specifically, the irradiance on the camera viewing a surface is proportional to $k_d \langle \vec{L}, \vec{N} \rangle$, where $\vec{L}$ is the unit-norm vector aligned with the illuminant (i.e. in the direction $\theta_i$, $\varphi_i$), $\vec{N}$ is the unit-norm surface element's normal, and $\langle , \rangle$ represents the inner product between two vectors. The light intensity of a Lambertian surface, as measured by the camera (e.g., irradiance of the patch 24), is substantially independent of the viewing direction. This means that, if an object having a surface with purely Lambertian reflectivity is scanned (and assuming that neither the object nor the light sources moved in the process), the same surface should have the same color when viewed from the various viewpoints captured during scanning.

On the other hand, non-Lambertian or specular surfaces exhibit a certain component of specular reflectance, which causes a glossy appearance and specular highlights. A purely specular surface element (e.g., a mirror) is one where its BRDF is equal to $1/\cos\theta_i$ when $\theta_i = \theta_e$ and $\varphi_i = \varphi_e + \pi$, and where its BRDF is 0 otherwise. In other words, a mirror reflects light only in the plane formed by the incident direction $\theta_i$, $\varphi_i$ and the surface normal $\vec{N}$, and at an angle with the normal $\vec{N}$ that is opposite to the incidence angle. Non-mirrored surfaces also exhibit a specular component, but the light reflected is distributed or spread in a "lobe," rather than in just one direction. In contrast with the case of Lambertian surfaces, the color of a surface with some amount of specularity typically changes with the viewpoint (as seen, for example, in FIGS. 3A, 3B, and 3C above).

While knowledge of the complete surface BRDF would be necessary to accurately reproduce the reflectance of a surface, the BRDF is generally difficult to compute, at least because the BRDF is a function of four variables: $\theta_i$, $\varphi_i$, $\theta_e$, $\varphi_e$. As such, many rendering engines apply simpler rendering models that still produce good results. Generally, these simpler models use a dichromatic model that assumes that the light reflected by the object can be approximated by the sum of two components: a diffuse reflection (or Lambertian) component and a specular reflection component.

The diffuse reflection component represents the component of light reflected by the surface that is independent of the viewpoint (e.g., that looks the same from every viewpoint). The diffuse reflection component can be represented by a standard color vector $k_d$ with three components (e.g., <red, blue, green>).

The specular reflection component of the dichromatic model describes the component of the reflected light that changes with the viewpoint. Note that the color of the specularly reflected light is in most cases equal to the color of the light source (with metallic materials being among the notable exceptions). The specular BRDF component may be modeled with simple parametric models. For example, the Phong model represents a surface's specular component of the BRDF as follows:

$$k_s \langle 2 \langle \vec{L}, \vec{N} \rangle \vec{N} - \vec{L}, \vec{V} \rangle^\alpha$$

where $\vec{L}$ is the unit-norm vector aligned with the light source (e.g., in the direction $\theta_i$, $\varphi_i$), $\vec{V}$ is the unit-norm vector aligned with the viewer or camera (e.g., in the direction $\theta_e$, $\varphi_e$), and $\vec{N}$ is the unit-norm vector aligned with the normal of the surface patch, respectively. The constant $k_s$ determines the strength of the specular component, while the exponent $\alpha$ controls the width of the reflectance "lobe" (e.g., the width of the visible highlights in the image).

Another parametric model for the specular component of the BRDF is the Torrance-Sparrow model, expressed as follows:

$$k_s F G e^{-\psi^2/2\sigma^2} / \langle \vec{V}, \vec{N} \rangle$$

where F is the Fresnel coefficient, G is the geometrical attenuation factor, $\psi$ is the angle between the surface normal and the bisector of the viewing direction and the light source direction, and $\sigma$ represents the surface roughness (note that in this case, the width of the reflectance lobe is controlled by the parameter $\sigma$).

The methods described above remain valid also if the light source instead of being a single point is a linear or planar source. In these cases, the light source can be decomposed in a set of single point sources, and the same procedure to compute the diffuse and specular components can be repeated for each source point, integrating all the contributions to get the final result. If multiple lights are present in the scene, the contribution of each light is simply summed.

The model may also include an additional source of light called ambient light, which models the light coming from the surrounding environment instead of a particular light source. An example of this can be the light coming from the sun or the light inside a room. Ambient light is usually modeled by multiplying the diffuse surface color by a constant intensity, regardless of the normal at a specific location.

It is important to note that the reduced BRDF models described above can be represented by a small number of parameters, such as the diffuse reflection color vector $k_d$ and the specular component parameters ($k_s$ and $\alpha$ in the Phong model, or $k_s FG$ and $\sigma$ in the Torrance-Sparrow model). When rendering a surface patch with normal $\vec{N}$, seen from a certain viewpoint $\vec{V}$ under a light with a certain color from direction $\vec{L}$, one may compute the surface's BRDF using one of the models described above, with the model parameters stored for that surface patch, and finally obtain the color of the rendered patch image. To make the rendering more realistic, usually the normal vectors $\vec{N}$ between neighboring polygons may be interpolated, creating a smooth transition from one polygon to the other.

Capturing Bidirectional Reflectance Distribution Function

Aspects of embodiments of the present invention relate to capturing a bidirectional reflectance distribution function (BRDF) for each patch of an object scanned by a scanning system 100. Generally, one goal of a 3D scanning process is to acquire an accurate 3D representation or 3D model of the surface of the object, along with a representation of the "texture" of the object's surface. In order to render a realistic image of the scanned 3D model, the texture needs to include color information (e.g., the color of the surface of the object) together with the reflectance properties of the surface, where the reflectance properties are encoded in the BRDF.

In the 3D model, the surface of the object is usually represented by a mesh of planar polygons (typically triangles). For example, the surface of an object may be represented with tens or hundreds of thousands of triangular patches. In a simple rendering procedure, each one of these patches is "painted" with a texture (or "texturized"). Because the patch is planar, its texture can be represented as a polygonal image. The shape (or geometry) and texture information of an object could be encoded in one of several possible file formats (e.g., Wavefront .obj files that define the model vertices in <x,y,z> coordinates). The model can then be rendered by a rendering engine and displayed on a computer screen. One method for rendering models using a rendering engine will be described in more detail in a following section on rendering.

As seen in FIGS. 3A, 3B, and 3C, for a surface with a non-negligible specular component, the content of a patch may be different across the cameras that see the same patch. It is particularly evident in the case of strong highlights, which may appear in correspondence of a surface element at one image but not at another image. For example, FIG. 3A shows a long linear white highlight extending from the toe of the shoe up along the entire length of the vamp of the shoe, while in FIG. 3B a highlight appears only at the tip of the toe of the shoe.

As discussed above, with respect to FIGS. 2A, 2B, and 2C, a naïve approach that neglects the presence of specularities would likely result in unrealistic rendering because the highlights are "fixed" with the object and do not depend on the position of the virtual camera used for rendering, thus affecting the realism of the rendered scene.

Figure 7A:
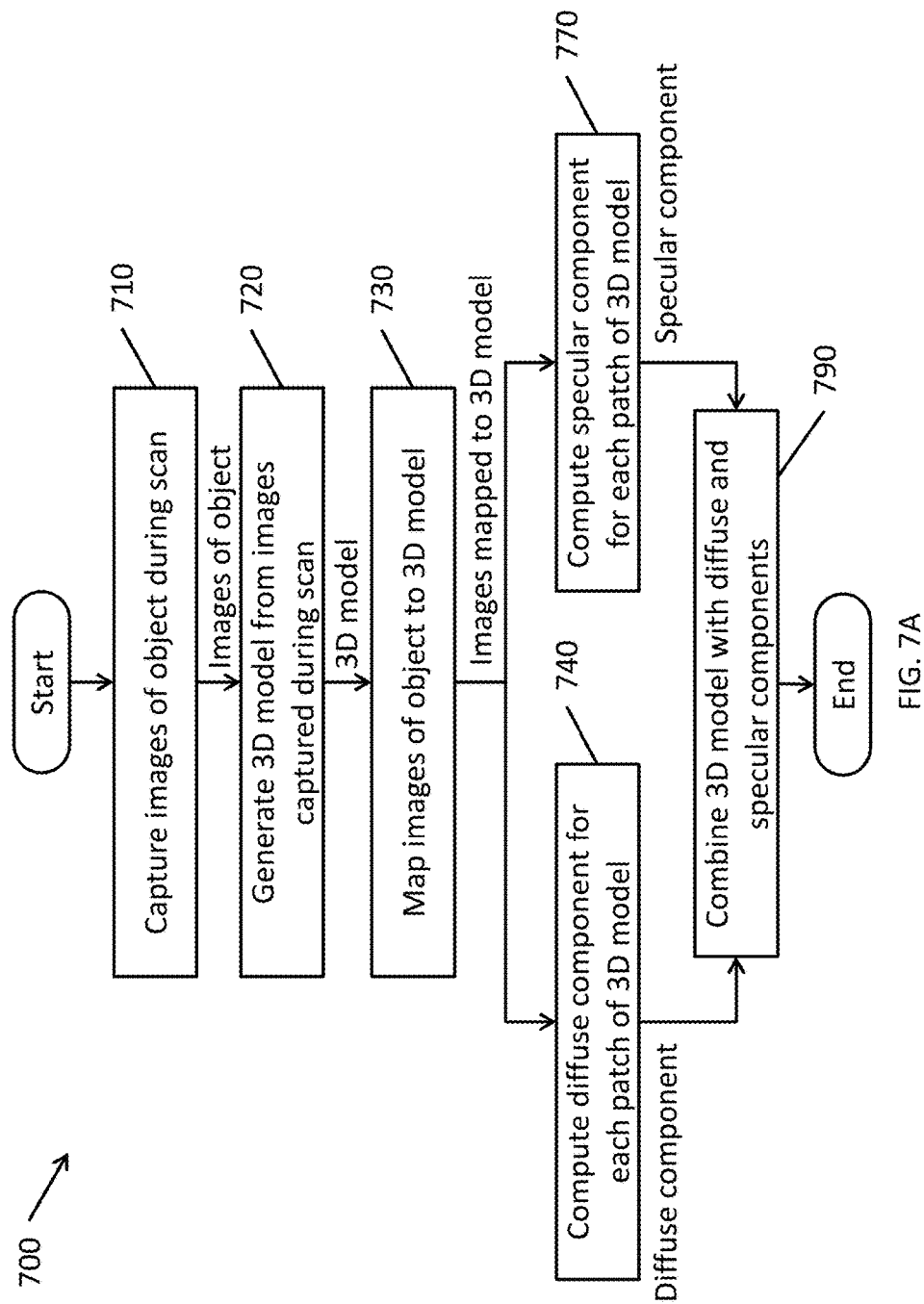
FIG. 7A is a flowchart of a method for scanning an object to capture a three-dimensional (3D) model of the object, its texture information, and bidirectional reflectance distribution function (BRDF) information according to one embodiment of the present invention.

FIG. 7A is a flowchart of a method for scanning an object to capture a three-dimensional (3D) model of the object, and to compute its texture information and bidirectional reflectance distribution function (BRDF) information from the images acquired during scanning.

During the process of scanning an object in operation 710, the same patch of the surface of the object is typically seen from multiple cameras at different poses. For example, the scanning system 100 may be moved around the object to capture the object from different angles. Alternatively, the object can be moved (e.g., rotated and/or translated) with respect to the scanning system. In addition, a stereoscopic scanning system includes multiple cameras, where each camera captures images of the object from different angles.

In operation 720, the host processor computes a 3D model from the images captured during the scan. As described above, this may be performed by performing feature matching between different images of the object and using changes in disparity to estimate depth information and by matching and joining separate depth maps together using the techniques described in, for example, U.S. patent application Ser. No. 15/630,715 "Systems and methods for scanning three-dimensional objects," filed in the United States Patent and Trademark Office on Jun. 22, 2017, the entire disclosure of which is incorporated herein by reference.

Once the shape or geometry of the object is computed and generated as a (non-textured) three-dimensional model, in operation 730 the processor maps the color information from the images of the object captured in operation 710 to the 3D model generated in operation 720 by computing the position of all triangles in the mesh (the 3D model) with respect to a reference system and by estimating the pose of all cameras in the reference system. The resulting map allows each triangular patch to be projected onto each color camera that sees that patch, defining a region corresponding to the shape of the patch (e.g., a triangular region) within the image. In other words, in operation 730, the portions of the images corresponding to each of the patches are identified on a patch-by-patch basis. The resulting image regions associated with each patch of the surface can then be used to determine the diffuse (or Lambertian) and specular components of the BRDF for the points in each of the patches. Because each image region is captured from a different viewpoint, each image region may have a different shape. As such, according to one embodiment of the present invention, the image regions are also be transformed such that each has the same shape (e.g., each image region may be transformed to the same shape as that of a view of the patch along its surface normal direction).

Computing Diffuse Components of BRDF

Figure 7B:
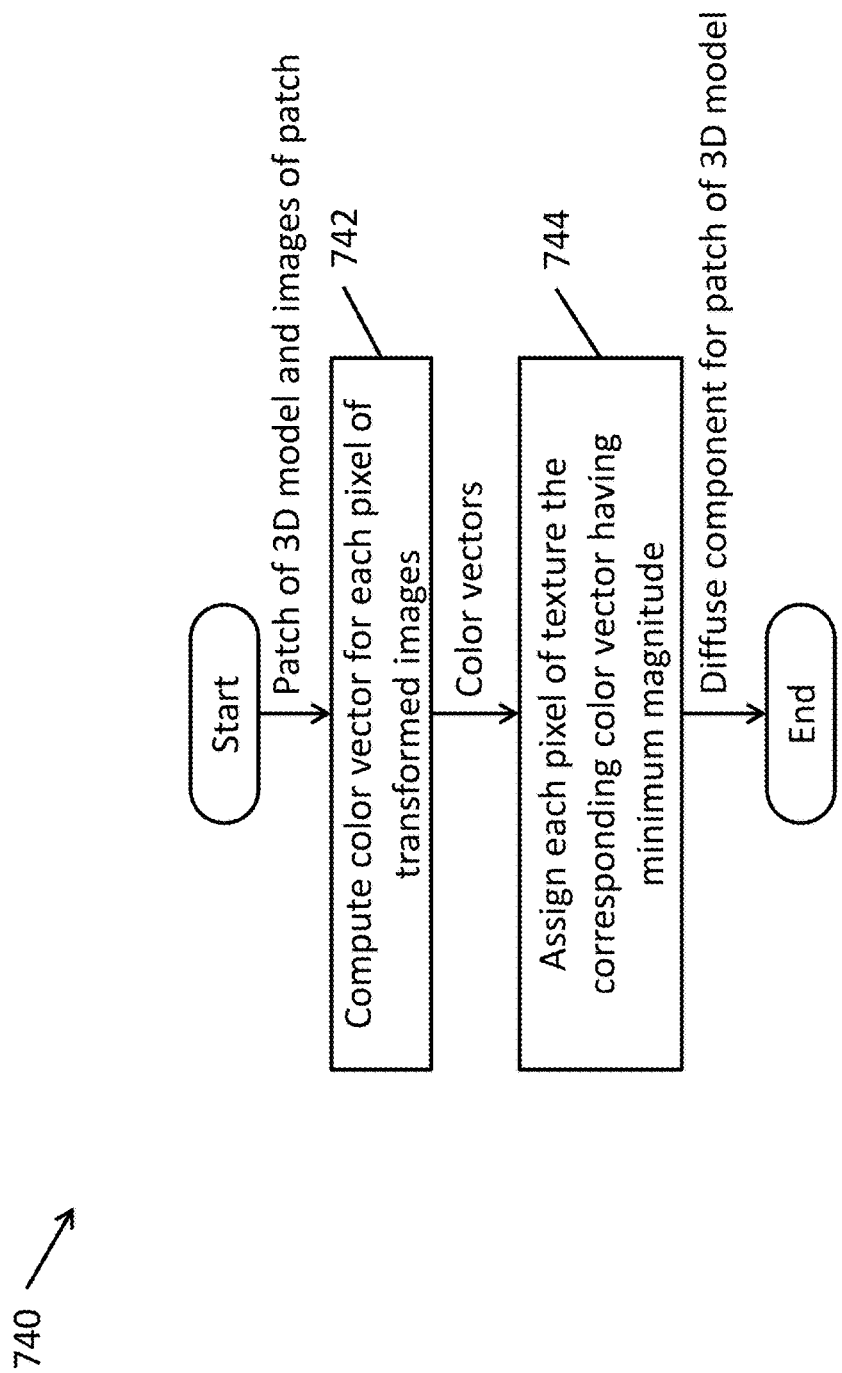
FIG. 7B is a flowchart of a method for computing the Lambertian component of the BRDF for a patch of a 3D model according to one embodiment of the present invention.
Figure 8B:
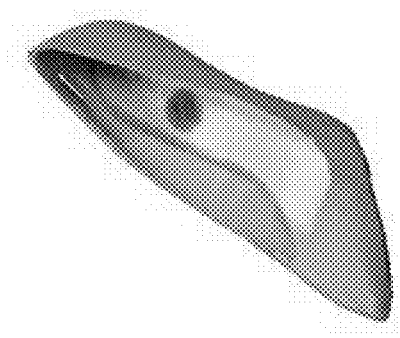
FIGS. 8A and 8B depict renderings, under diffuse light, of a 3D model of a shoe captured in accordance with embodiments of the present invention.
Figure 8A:
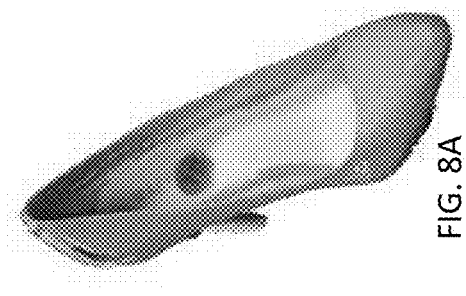

In operation 740, the processor computes the diffuse component of the BRDF for each patch. According to one embodiment, the processor computes a "diffuse texture map" of the surface, which represents the diffuse component of the BRDF, which is independent of the viewpoint. FIG. 7B is a flowchart depicting the calculation of the diffuse component for a single patch according to one embodiment of the present invention. In operation 742, a color vector (e.g., a <red, blue, green> color vector) is computed (or retrieved from the images) for each pixel of the image regions associated with the patch. In operation 744, each pixel of the output texture is assigned the color vector with minimum magnitude among the color vectors of all image regions onto which this patch projects. As such, assuming that at least one of the views of the patch does not exhibit highlights, this technique provides the diffuse component of the BRDF for each patch, and the diffuse component may be free (or substantially free) of specular highlights. FIGS. 8A and 8B are examples of models rendered with only the diffuse component of the BRDF (e.g., with the specular component set to 0).

Computing Specular Components of BRDF

In general, a rendering of an object using the diffuse texture map alone does not look realistic when the original surface has a specular component (e.g., when the original object has at least some glossiness). One could render the surface more realistically by defining a reduced BRDF model (such as the Phong model or the Torrance-Sparrow model described above) at each patch.

In some embodiments of the present invention, the scanning system 100 displays a rendering of the 3D model based on the diffuse component of the BRDF, and further provides a user interface for the user to manually control the parameters of the specular component of the reduced BRDF model (e.g., $k_s$ and $\alpha$ in the case of the Phong model, or $k_s FG$ and $\sigma$ is the case of the Torrance-Sparrow model) so that the rendered images closely reproduce the characteristics of the surface. For example, the color images captured by the scanning system 100 may be displayed adjacent the rendered model such that the user can manually compare the appearance of the rendered model with the captured images of the physical object, and a user interface control such as a numerical input box, a slider, or a knob may be used to change the values of each of the parameters. In some embodiments, both parameters can be changed at the same time by selecting a location in a two dimensional area on the screen, where the two dimensions of the area correspond to the two different parameters of the reduced BRDF model. For example, these parameters may be $k_s$ and $\alpha$ in the case of the Phong model, or $k_s FG$ and $\sigma$ is the case of the Torrance-Sparrow model, along the horizontal and vertical axes of the two dimensional area. As noted above, $k_s$ controls the strength of the reflection (e.g., how much light is reflected), while $\alpha$ in the Phong model or $\sigma$ in the Torrance-Sparrow model controls the width of the lobe (e.g., the degree to which the specular highlight is still visible when "off angle").

Figure 9B:
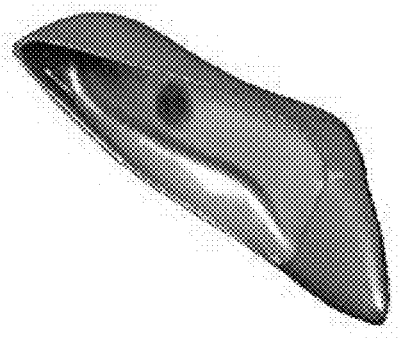
FIGS. 9A and 9B depict renderings, under point light, of a 3D model of a shoe captured in accordance with embodiments of the present invention.
Figure 9A:
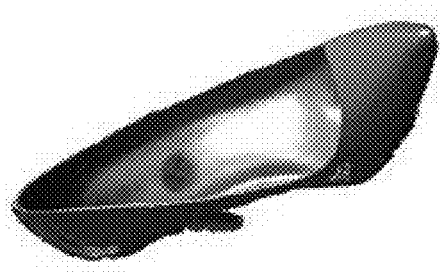

By computing and storing the reflectance properties of the surface, as expressed by the reduced BRDF representation, the resulting model is independent of the particular illumination that was in place during scanning. For example, as described earlier, any visible highlights are removed, as seen in FIGS. 8A and 8B, which depict renderings, under diffuse light, of a 3D model of a shoe captured in accordance with embodiments of the present invention. FIGS. 9A and 9B depict renderings, under point light, of a 3D model of a shoe captured in accordance with embodiments of the present invention. (In FIGS. 9A and 9B, the parameters of the specular component of the BRDF were manually set by a user.) As such, aspects of embodiments of the present invention provide an improvement over techniques that merely record the color acquired by the camera during scanning.

In addition, once the original color of the model and the surface properties have been retrieved, these parameters can be modified to produce different versions of the scanned model. For example, the shoe of FIGS. 8A, 8B, 9A, and 9B can be rendered in a different color by modifying the texture, or could be made more or less reflective by changing the BRDF parameters, without recomputing a model and without performing a new scan to collect a new 3D model.

In other embodiments of the present invention, the scanning system 100 computes the parameters (e.g., $k_s$ and $\alpha$ in the case of the Phong model, or $k_s FG$ and $\sigma$ is the case of the Torrance-Sparrow model) from the images collected during scanning, as described earlier.

Figure 7C:
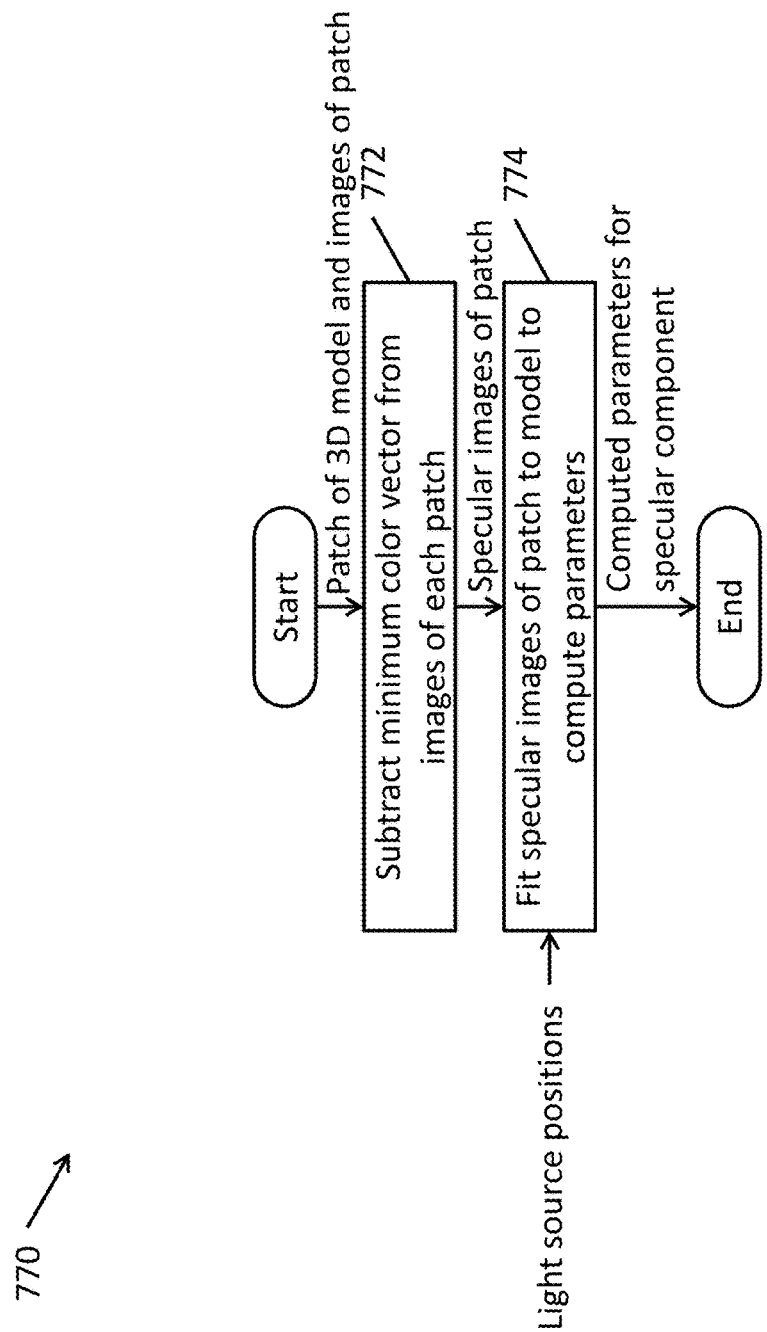
FIG. 7C is a flowchart of a method for computing the specular component of the BRDF for a patch of a 3D model according to one embodiment of the present invention.

FIG. 7C is a flowchart of a method for computing the specular component of the BRDF for a patch of a 3D model according to one embodiment of the present invention. Referring to FIG. 7C, in operation 772, the minimum color vector among the color vectors is selected as the diffuse component (e.g., the minimum color vector computed in operation 744 may be reused here) and is subtracted from the color vector for every other image region corresponding to the patch to obtain the specular component for each patch (referred to as the specular images of the patch). In operation 774, the specular images of the patch, the camera positions of the camera for each of the specular images (as measured by, for example, the inertial measurement unit of the scanning sensor 100 or, known positions of the cameras, such in the case of the fixed cameras arranged around a conveyor belt), the light source positions, and the direction of the surface normal of the patch are used to solve for the parameters of the corresponding model (e.g., $k_s$ and $\alpha$ in the case of the Phong model, or $k_s FG$ and $\sigma$ is the case of the Torrance-Sparrow model).

The light source positions may be known or estimated in a variety of different ways. In some embodiments, the illumination source 106 may be configured to be sufficiently bright in the visible range so as to overwhelm other sources of light in the scene during scanning. Similarly, in the case of an arranged setup such as the conveyor belt shown in FIG. 5B, the light source 56 (or multiple such light sources 56) may be arranged such that those light sources dominate the illumination of the object (e.g., the arrangement shown in FIG. 5B may be enclosed within a substantially light-proof box). In still other embodiments of the present invention, the environment may be characterized and the positions of the light sources in the environment may be stored in memory (e.g., the positions may be manually identified by a user, or a calibration tool may be used to automatically detect the positions of the lights with respect to the object at various locations on the conveyor belt). In some cases, the characteristic of the light may change over time, such as in the case of a window or skylight that provides natural light to a scene that changes over the course of the day, and the stored parameters of the light take into account the time of day, the time of the year (to, for example, adjust for changing sunrise and sunset times, as well as the path of the sun across the window), and weather (e.g., cloudy versus sunny days).

In some embodiments, the solver operates by selecting an initial set of parameters and rendering a plurality of views of patch based on the parameters, where each of the views corresponds to a location of a camera that imaged the patch during the scan. The rendered views are then compared with the actual views captured by the cameras, and an error function can be computed based on differences between the rendered views and the actual views (e.g., a sum of the squares of the differences). The parameters can then be iteratively updated based on the error function by applying, for example, gradient descent to compute parameters (e.g., $k_s$ and $\alpha$ in the case of the Phong model, or $k_s FG$ and $\sigma$ is the case of the Torrance-Sparrow model) that minimize the error function.

Intuitively, the parameter $k_s$ may be estimated based on the magnitude of the largest specular image, and the parameter $\alpha$ in the case of the Phong model or the parameter $\sigma$ in the case of the Torrance-Sparrow model may be estimated based on the solid angle formed by the camera positions that capture the specular highlight at the patch (e.g., the fraction of image regions that depict the specular highlight).

Rendering a Model with Captured Bidirectional Reflectance Distribution Function

One aspect of embodiments of the present invention relate to the rendering of a model having a captured bidirectional reflectance distribution function (BRDF).

A rendering engine may render a 3D model by defining the position and orientation of a virtual camera, and then projecting each patch onto the virtual camera's focal plane, without displaying patches that would be occluded by other patches in the same line of sight. Projecting the texture of a patch onto the camera's focal plane can be implemented as a homographic warping, with parameters defined by the location and orientation of the patch in space, and by the pose (orientation and location) of the virtual camera. However, in such a simple rendering procedure, the color of a projected patch would be independent of the viewpoint. As discussed earlier, this is consistent with a surface with Lambertian characteristics, but not with surfaces that have a non-negligible specular component.

As such, one embodiment of this disclosure relates to a method to enable realistic rendering of a shape acquired using a 3D scanning method. For each surface element, a reduced representation of the corresponding surface's BRDF (for example, the parameters of the Phong or of the Torrance-Sparrow model, as described above) is stored in memory. At rendering time, these parameters are used to create an image of the shape under any desired light. The reduced BRDF representation is computed directly from the images acquired during the scanning process, requiring no additional or specialized hardware (e.g. reflectometers).

To render a colored 3D model from the point of view of a virtual camera, in addition to the relative position and orientation or the virtual camera with respect to the model, also the intrinsic parameters (represented by the matrix K) of the virtual camera have to be known. Given a coordinate system, for simplicity centered on the 3D model, the camera position and orientation can be expressed by means of the matrix M. Rendering a 3D model in this way includes projecting all the points (or polygons) of the model in the image plane of the virtual camera. Given a point $P=[x, y, z]$ of the model, the corresponding pixel $p=[u, v]$ in the image plane is $$p = \frac{1}{z} * KMP.$$

Once the correspondence between P and p is known, the only left unknown is the color to assign to such pixel.

To render the surface's diffuse component under a single point illuminant or virtual light source, the diffuse reflection color vector is multiplied by the cosine of the angle between the surface normal and the direction to the light sources. In addition, its color is combined with the color of the light source, for example using the standard diagonal (Von Kries) model, whereby the red, green, and blue components of the light source color are each multiplied by the red, green, and blue components of the diffuse reflection color vector.

The diffuse reflection color vector is added to the specular component of the surface, which may be rendered according to, for example, the Phong model or the Torrance-Sparrow model, as described above. In this case, the surface normal $\vec{N}$ of the model, the viewing direction of the virtual camera $\theta_e$, $\varphi_e$, the direction of the incident from the single point illuminant $\theta_i$, $\varphi_i$, and the parameters of the specular component of the BRDF (e.g., $k_s$ and $\alpha$ in the case of the Phong model, or $k_s FG$ and $\sigma$ is the case of the Torrance-Sparrow model), are supplied to the model to compute the specular component.

The contribution to the diffuse and specular components for each pixel can be computed and added to the pixel for each illuminant or virtual light source in the scene.

As such, aspects of embodiments of the present invention are directed to the rendering of scanned objects with their corresponding captured BRDF.

User Experience Example

As a concrete example of a user experience of scanning an object, a system according to one embodiment of the present invention may perform the following operations.

A user may operate the scanning system to acquire data from imaging devices such as color cameras, depth cameras, and from other sensors such as an inertial measurement unit (IMU).

The scanning system aggregates the acquired data of data to align and combine the raw data to generate a 3D model as described above. In some embodiments, the scanning system may display, as a point cloud, a preview of the raw data being aggregated on the display device 114.

The collection and aggregation of the data may be repeated until the user is satisfied with the aggregated data (e.g., until the user has collected enough views of the object).

The scanning system then generates a 3D model based on the aggregated data, which may include generating a polygonal mesh where each polygon is oriented given its normal vector.

The scanning system then assigns a texture to each polygon in the mesh, where the texture is retrieved from the image data collected from the color cameras, and the parameters of the BRDF are estimated as described above. For example, the scanning system may display user interface controls and accept user input for specifying the parameters of the BRDF, or the scanning system (or a cloud-based processor) may automatically calculate or estimate the parameters of the BRDF. The user may also specify properties of the ambient illumination, such as position, type and color of the lights affecting the captured scene.

Regardless of where the rendering engine runs, whether on the scanning system 100 or on a cloud based processor, the rendering module uses the rendering-time light source position(s) and observer view point and renders the 3D model using the captured reflectance properties of the model for the observer.

A user may then choose to render the captured 3D model with its associated texture and BRDF parameters. The user may specify a virtual context that in which to render the model, which includes the geometry of the scene in which the model has to be rendered, a set of lights that will illuminate the virtual scene, and a position and orientation of a virtual camera.

A user may also control the scanning system to render the model in different virtual contexts and from different viewpoints, without needing to capture a new model. A user may further modify the BRDF parameters and/or the texture data to experiment with how the appearance of the object would change in accordance with different colors or textures or, more broadly, characterized by a different BRDF.

For example, if the scanned object was a shoe made of a particular type of fabric, a BRDF specific to that fabric would be estimated. The user might then be interested in understanding how the shoe would appear if it were made of leather. In order to do that, the user may modify the BRDF using the controls presented in the user interface to specify the BRDF values that are typical of leather. The typical BRDF values for different materials may also be organized in a collection of typical BRDF values of common materials, which can be presented to the user in the user interface of the scanning system 100 in the form of a list.

In one embodiment of the invention, the user interface allows the user to select a particular region of the object that is being rendered, and it allows the manual modification of the BRDF of only for the selected portion of the object. For instance, in the case of a shoe with a rubber sole, the user interface may allow the user to select the sole of the shoe and to change the BRDF parameters of the sole to the parameters typical of those of leather, in order to depict the same shoe sole with the reflectance characteristics a leather sole. The selection of the portion of the rendered object for which the manual modification of the BRDF is applied can be identified manually by the user or semi-automatically by means of standard 3D object segmentation algorithms (see, e.g., C. Dal Mutto, P. Zanuttigh, G. M. Cortelazzo "Fusion of Geometry and Color Information for Scene Segmentation" IEEE Journal of Selected Topics in Signal Processing, 2012.)

Defect Detection

Aspects of embodiments of the present invention are directed to systems and methods for quality monitoring and defect detection. For example, a 3D scanning system according to embodiments of the present invention may capture a 3D scan of an object produced on a manufacturing line, as the object moves along a conveyor belt, as shown in FIGS. 5C through 5K.

Such a 3D scan may capture a substantially diffuse or Lambertian model of the color information of the object on the manufacturing line, thereby removing visual artifacts in the captured model that arise due to specular highlights from bright and directed lights. This removal of artifacts arising from specular highlights improves the robust comparison of the captured 3D scan of the object with a reference 3D model of the object in order to detect defects in the object on the manufacturing line. As such, in some embodiments of the present invention the computation of the specular component of the BRDF may be omitted and the generated model may be purely diffuse with all highlights removed, thereby providing a simple model for comparing the scanned model with a reference model.

The scanned model and the reference model can be compared using a technique such as iterative closest point (ICP) to align the models, and to compute a map of the differences between the models. Techniques for aligning models are also described in U.S. patent application Ser. No. 15/630,715 "Systems and methods for scanning three-dimensional objects," filed in the United States Patent and Trademark Office on Jun. 22, 2017, the entire disclosure of which is incorporated herein by reference. The comparisons may be made on a region-by-region basis of the models. For example, when comparing a scan of a shoe with a reference model of the shoe, the comparison may show the distance between the reference position of a logo on the side of the shoe with the actual position of the logo in the scanned model. As another example, the comparison may show the distance between the correct position of an eyelet of the shoe and the actual position of the eyelet.

If the differences between the scanned model and the reference model exceed a threshold value, then the quality control system may flag the scanned object as falling outside of the quality control standards and automatically reroute the object for further inspection or to be rejected from the production.

Furthermore, captured information regarding the BRDF of the object may also be used to detect defects in the surface of the object, such as the detection of scuffing or imperfections in portions that are expected to be glossy, or the detection of smooth portions that are expected to be textured. The captured BRDF information may also identify missing components. For example, if an eyelet of a shoe is typically reinforced with a shiny metal grommet and the scanned model does not detect a portion having high specularity where it expects to find the grommet, then this may also be detected as a defect (e.g., a missing grommet). As still another example, if the BRDF information expects the outsole of the shoe to extend a particular height up the side of shoe, the measured BRDF values may be used to detect whether the particular portion is made of rubber or fabric.

As such, aspects of embodiments of the present invention may be applied to defect detection by comparing the color and BRDF information of a scanned model of a particular object with a reference model of the object and detecting a defect when the differences between the scanned model and the reference model exceed a threshold level.

According to some embodiments of the present invention, defect detection may be implemented using a convolutional neural network (CNN). The CNN may extract feature vectors from the 3D models of the defective and defect-free objects. The resulting feature vectors may be used to train a machine learning algorithm to classify the various types of defects observed in the objects. During training, the diffuse reflection component of the BRDF information allows the CNN and the classifier to be trained substantially without the influence of specular artifacts due to lighting conditions. In addition, FIG. 10 is a flowchart of a method according to one embodiment of the present invention for generating (or synthesizing) additional training data for training a machine learning algorithm to categorize regions of a 3D model as clean or defective by removing the artifacts generated by the lighting at the time of the collection.

Figure 10:
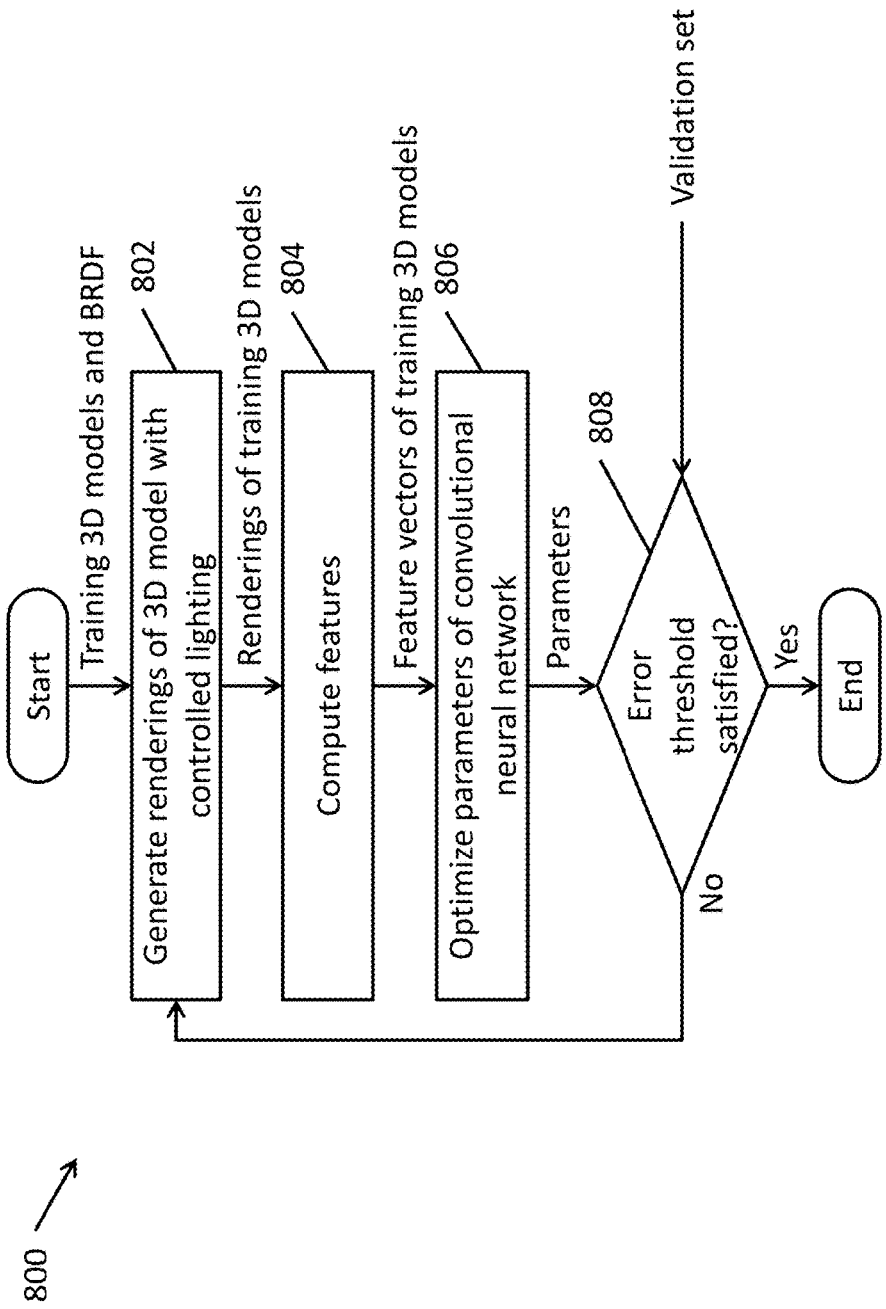
FIG. 10 is a flowchart of a method according to one embodiment of the present invention for generating additional training data for training a machine learning algorithm to categorize regions of a 3D model as clean or defective by removing the artifacts generated by the lighting at the time of the collection.

As described in the flowchart of FIG. 10, the 3D model is rendered with controlled lightning. By removing the specular component and rendering the 3D model with artificial lighting (operation 802), the training set can also be augmented with additional renderings of the 3D model. These additional renderings may be used to compute feature vectors in operation 804, which provide more information to optimize the parameters of the convolutional neural network (or other learning algorithm) in operation 806.

In operation 808, the training error metric (e.g., the difference between the classifications of the training set and the predictions by the CNN based on the feature vectors of the training set as configured by the parameters computed in operation 806) and the validation error metric (e.g., the difference between the classifications of a validation set of 3D models that are not the same 3D models of the training set) and the predictions by the CNN based on the feature vectors of the training set as configured by the parameters computed in operation 806) are compared with a threshold (or corresponding thresholds). If the error exceeds the threshold, then the process may return to operation 802 to generate additional renderings with controlled lighting (e.g., different virtual lighting conditions) to continue training the CNN. If the threshold is satisfied (e.g., both the training error metric and the validation error metric are within the threshold), then a test set of 3D models may be processed by the system (e.g., views of the test set may be rendered and classified by the trained CNN).

During operation, the trained CNN may be applied to extract a feature vector from a scan of an object under inspection, and the classifier may assign a classification to the object, where the classifications may include being defect-free (or "clean") or having one or more defects. Such a trained CNN is robust against changes in lighting (e.g., different lighting conditions in the models captured for the training set versus the lighting conditions during operation, as well as differences in lighting in different areas on a manufacturing floor or at different factories) because the resulting models are substantially independent of lighting. Some examples of techniques for extracting feature vectors from 3D models are described in "Systems and methods for automatically generating metadata for media documents," U.S. patent application Ser. No. 15/675,684, filed in the United States Patent and Trademark Office on Aug. 11, 2017, the entire disclosure of which is incorporate by reference herein.

Figure 11:
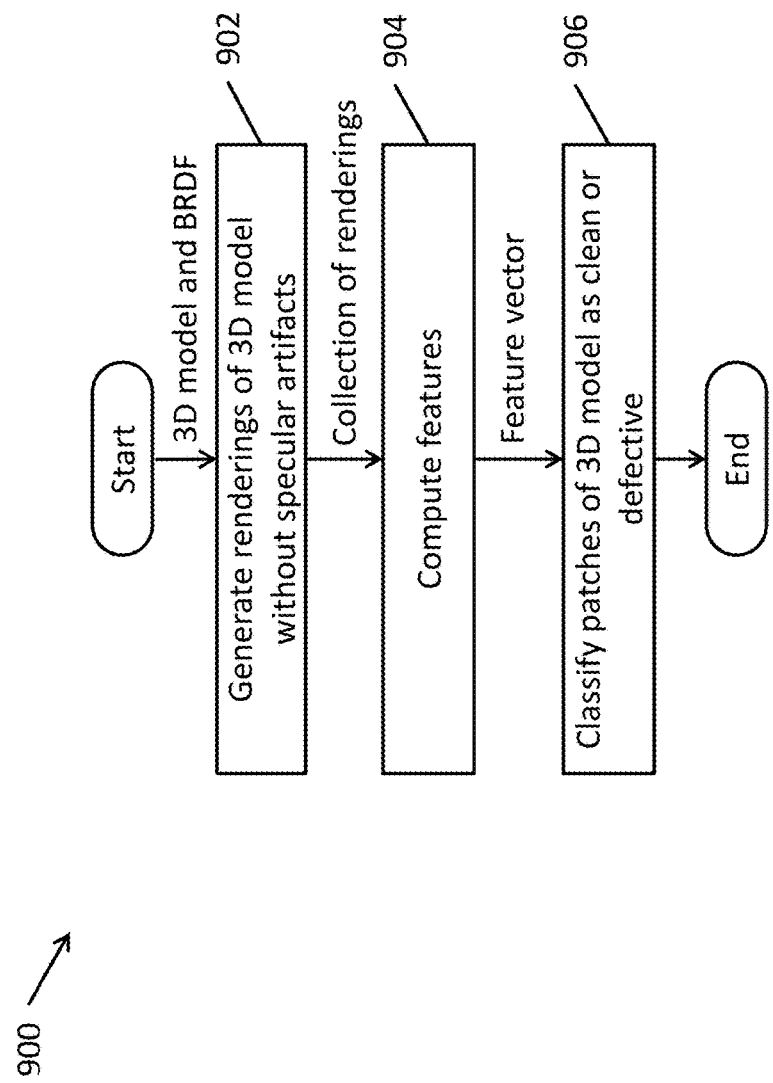
FIG. 11 is a flowchart of a method according to one embodiment of the present invention to detect defects on a 3D model by generating renderings of the object without light artifacts, computing feature vectors and classifying each region of the 3D model as clean or defective.

FIG. 11 is a flowchart of a method 900 according to one embodiment of the present invention to detect defects on a 3D model by generating renderings of the object without light artifacts, computing feature vectors and classifying each region of the 3D model as clean or defective. In operation 902, the 3D model of the scanned object and its BRDF are rendered without specular artifacts (e.g., with the specularity component of the BRDF set to zero) to generate a collection of diffuse views of the object (e.g., from different views). In operation 904, features may be extracted from the collection of renderings of the object to generate a feature vector. In operation 906, the feature vector may then be supplied to a trained machine learning algorithm (e.g., trained based on the process shown in FIG. 10 to produce configuration parameters as computed in operation 806) to classify the patches of the 3D model (e.g., as mapped based on the renderings) as being clean or defective. In other embodiments of the present invention, the object may simply be identifies as being clean or defective, without further including classifications of the object as being clean or defective on a patch-by-patch basis.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for generating a three-dimensional (3D) model of an object, comprising:
capturing a plurality of images of the object from a plurality of viewpoints, the images comprising a plurality of color images;
generating a 3D model of the object from the images, the 3D model comprising a plurality of planar patches;
for each patch of the planar patches:
mapping a plurality of image regions of the plurality of images to the patch, each image region comprising at least one color vector; and
computing, for each patch, at least one minimal color vector among the color vectors of the image regions mapped to the patch;
generating a diffuse component of a bidirectional reflectance distribution function (BRDF) for each patch of planar patches of the 3D model in accordance with the at least one minimal color vector computed for each patch;
outputting the 3D model with the BRDF for each patch, the BRDF further comprising a specular component separate from the diffuse component;
rendering one or more diffuse views of the object;
computing a plurality of features based on the one or more diffuse views of the object; and
assigning a classification to the object in accordance with the plurality of features, the classification comprising one of: a defective classification and a clean classification,
wherein the assigning the classification to the object in accordance with the plurality of features is performed by a convolutional neural network, and
wherein the convolutional neural network is trained by:
receiving a plurality of training 3D models of objects and corresponding training classifications;
rendering a plurality of views of the 3D models with controlled lighting to generate training data;
computing a plurality of feature vectors from the views by the convolutional neural network;
computing parameters of the convolutional neural network;
computing a training error metric between the training classifications of the training 3D models with outputs of the convolutional neural network configured based on the parameters;
computing a validation error metric in accordance with a plurality of validation 3D models separate from the training 3D models;
in response to determining that the training error metric and the validation error metric fail to satisfy a threshold, rendering additional views of the 3D models with different controlled lighting to generate additional training data;
in response to determining that the training error metric and the validation error metric satisfy the threshold, configuring the neural network in accordance with the parameters;
receiving a plurality of test 3D models of objects with unknown classifications;
rendering a plurality of views of the test 3D models with controlled lighting to generate testing data; and
classifying the test 3D models using the rendered views of the test 3D models and the configured convolutional neural network.

2. The method of claim 1, further comprising:
aligning the 3D model with a reference model;
comparing the 3D model to the reference model to compute a plurality of differences between corresponding portions of the 3D model and the reference model; and
detecting a defect in the object when one or more of the plurality of differences exceeds a threshold.

3. The method claim 1, further comprising: receiving a user input specifying one or more parameters of the specular component of the BRDF.

4. The method of claim 3, wherein the specified one or more parameters of the specular component of the BRDF are applied to a selected portion of the 3D model.

5. The method of claim 1, further comprising computing the specular component of the BRDF, the computing the specular component comprising, for each of the planar patches:
subtracting the at least one minimal color vector from the color vector of each of the image regions mapped to the patch to compute a plurality of specular images of the patch; and
computing one or more parameters of the specular component.

6. The method of claim 5, wherein the computing the one or more parameters of the specular component comprises:
initializing the one or more parameters;
rendering the 3D model in accordance with the BRDF set in accordance with the one or more parameters to render a plurality of rendered views of the patch;
computing an error function in accordance with a difference between the rendered views of the patch with the image regions mapped to the patch; and
computing the one or more parameters by iteratively updating the one or more parameters to minimize the error function.

7. The method of claim 1, further comprising:
arranging the 3D model in a virtual environment including a virtual camera and at least one light source;
rendering an image of the virtual environment including the 3D model, the image comprising at least one specular highlight from the reflection of the at least one light source off the 3D model; and
displaying the image.

8. The method of claim 1, wherein the plurality of images are captured by a plurality of different cameras.

9. The method of claim 8, wherein the plurality of images of the object are captured while the object is on a conveyor belt.

10. The method of claim 1, wherein the plurality of images of the object from the plurality of viewpoints are captured by a single camera.

11. The method of claim 10, wherein the camera is a stereoscopic depth camera comprising a first infrared camera, a second infrared camera, and a color camera.

12. The method of claim 1, wherein the 3D model is a model of less than the entire exterior surface of the object.

13. A system for generating a three-dimensional (3D) model of an object, the system comprising:
a depth camera system;
a processor coupled to the depth camera system; and
memory having instructions stored thereon that, when executed by the processor, cause the processor to:

capture a plurality of images of the object from a plurality of viewpoints, the images comprising a plurality of color images;

generate a 3D model of the object from the images, the 3D model comprising a plurality of planar patches;

for each patch of the planar patches:
map a plurality of image regions of the plurality of images to the patch, each image region comprising at least one color vector; and
compute, for each patch, at least one minimal color vector among the color vectors of the image regions mapped to the patch;

generate a diffuse component of a bidirectional reflectance distribution function (BRDF) for each patch of planar patches of the 3D model in accordance with the at least one minimal color vector computed for each patch;

output the 3D model with the BRDF for each patch, the BRDF further comprising a specular component separate from the diffuse component;

render one or more diffuse views of the object;

compute a plurality of features based on the one or more diffuse views of the object; and assign a classification to the object in accordance with the plurality of features, the classification comprising one of: a defective classification and a clean classification, wherein the instructions configured to cause the processor to assign the classification to the object in accordance with the plurality of features supply the features to a convolutional neural network, and wherein the convolutional neural network is trained by:
receiving a plurality of training 3D models of objects and corresponding training classifications;
rendering a plurality of views of the 3D models with controlled lighting to generate training data;
computing a plurality of feature vectors from the views by the convolutional neural network;
computing parameters of the convolutional neural network;
computing a training error metric between the training classifications of the training 3D models with outputs of the convolutional neural network configured based on the parameters;
computing a validation error metric in accordance with a plurality of validation 3D models separate from the training 3D models;
in response to determining that the training error metric and the validation error metric fail to satisfy a threshold, rendering additional views of the 3D models with different controlled lighting to generate additional training data;
in response to determining that the training error metric and the validation error metric satisfy the threshold, configuring the neural network in accordance with the parameters;
receiving a plurality of test 3D models of objects with unknown classifications;
rendering a plurality of views of the test 3D models with controlled lighting to generate testing data; and
classifying the test 3D models using the rendered views of the test 3D models and the configured convolutional neural network.

14. The system of claim 13, wherein the memory further stores instructions that, when executed by the processor, cause the processor to:
align the 3D model with a reference model;
compare the 3D model to the reference model to compute a plurality of differences between corresponding portions of the 3D model and the reference model; and
detect a defect in the object when one or more of the plurality of differences exceeds a threshold.

15. The system of claim 13, wherein the memory further stores instructions that, when executed by the processor, cause the processor to receive a user input specifying one or more parameters of the specular component of the BRDF.

16. The system of claim 15, wherein the specified one or more parameters of the specular component of the BRDF are applied to a selected portion of the 3D model.

17. The system of claim 13, wherein the memory further stores instructions that, when executed by the processor, cause the processor to: compute the specular component of the BRDF for each of the planar patches by:
subtracting the at least one minimal color vector from the color vector of each of the image regions mapped to the patch to compute a plurality of specular images of the patch; and
compute one or more parameters of the specular component.

18. The system of claim 17, wherein the memory further stores instructions that, when executed by the processor, cause the processor to: compute the specular component of the BRDF for each of the planar patches by:
initializing the one or more parameters;
rendering the 3D model in accordance with the BRDF set in accordance with the one or more parameters to render a plurality of rendered views of the patch;
computing an error function in accordance with a difference between the rendered views of the patch with the image regions mapped to the patch; and
computing the one or more parameters by iteratively updating the one or more parameters to minimize the error function.

19. The system of claim 13, wherein the memory further stores instructions that, when executed by the processor, cause the processor to:
arrange the 3D model in a virtual environment including a virtual camera and at least one light source;
render an image of the virtual environment including the 3D model, the image comprising at least one specular highlight from the reflection of the at least one light source off the 3D model; and
display the image.

20. The system of claim 13, further comprising a plurality of different cameras, wherein the plurality of images are captured by the plurality of different cameras.

21. The system of claim 20, wherein the plurality of different cameras is configured to image the object while the object is on a conveyor belt.

22. The system of claim 13, further comprising a single camera,
wherein the plurality of images of the object from the plurality of viewpoints are captured by the single camera.

23. The system of claim 22, wherein the camera is a stereoscopic depth camera comprising a first infrared camera, a second infrared camera, and a color camera.

24. The system of claim 13, wherein the 3D model is a model of less than the entire exterior surface of the object.

* * * * *